United States Patent
Li et al.

(10) Patent No.: US 12,175,698 B2
(45) Date of Patent: Dec. 24, 2024

(54) METHOD AND APPARATUS WITH OBJECT POSE ESTIMATION

(71) Applicant: Samsung Electronics Co., Ltd., Suwon-si (KR)

(72) Inventors: Weiming Li, Beijing (CN); Jiyeon Kim, Hwaseong-si (KR); Hyun Sung Chang, Seoul (KR); Qiang Wang, Beijing (CN); Sunghoon Hong, Hwaseong-si (KR); Yang Liu, Beijing (CN); Hao Wang, Beijing (CN); Yueying Kao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/545,333

(22) Filed: Dec. 8, 2021

(65) Prior Publication Data

US 2022/0180548 A1 Jun. 9, 2022

(30) Foreign Application Priority Data

Dec. 8, 2020 (CN) .................... 202011446331.X
Oct. 19, 2021 (KR) .................... 10-2021-0139573

(51) Int. Cl.
*G06K 9/00* (2022.01)
*G06T 7/10* (2017.01)
*G06T 7/50* (2017.01)
*G06T 7/70* (2017.01)
*G06V 10/25* (2022.01)

(52) U.S. Cl.
CPC .................. *G06T 7/70* (2017.01); *G06T 7/10* (2017.01); *G06T 7/50* (2017.01); *G06V 10/25* (2022.01); *G06T 2207/20021* (2013.01); *G06T 2207/20221* (2013.01)

(58) Field of Classification Search
CPC ..... G06T 7/70; G06T 7/10; G06T 7/50; G06T 2207/20021; G06T 2207/20221; G06V 10/25

See application file for complete search history.

(56) References Cited

U.S. PATENT DOCUMENTS

| 10,713,794 | B1 * | 7/2020 | He ........................ G06N 3/084 |
| 11,003,956 | B2 * | 5/2021 | Weinzaepfel .......... G06V 10/82 |
| 2014/0369608 | A1 | 12/2014 | Wang et al. |

(Continued)

FOREIGN PATENT DOCUMENTS

EP 3767521 A1 * 1/2021 ........... A61B 5/0088

OTHER PUBLICATIONS

Slice-Based Instance and Semantic Segmentation for Low-Channel Roadside LiDAR Data, Hui Liu et al., MDPI, Nov. 2020, pp. 1-26 (Year: 2020).*

(Continued)

*Primary Examiner* — Jayesh A Patel
(74) *Attorney, Agent, or Firm* — NSIP Law

(57) ABSTRACT

A processor-implemented method with object pose estimation includes: determining an image feature corresponding to a point cloud of an input image; determining semantic segmentation information, instance mask information, and keypoint information of an object, based on the image feature; and estimating a pose of the object based on the semantic segmentation information, the instance mask information, and the keypoint information.

30 Claims, 14 Drawing Sheets

(56) References Cited

U.S. PATENT DOCUMENTS

| | | | |
|---|---|---|---|
| 2019/0055326 | A1 | 2/2019 | Ghebremeskel et al. |
| 2020/0098168 | A1 | 3/2020 | Le et al. |
| 2020/0160479 | A1 | 5/2020 | Horesh et al. |
| 2020/0167955 | A1 | 5/2020 | Bao et al. |
| 2020/0247321 | A1 | 8/2020 | Kim et al. |
| 2020/0250982 | A1 | 8/2020 | Kim et al. |
| 2021/0026355 | A1* | 1/2021 | Chen .................. G06F 18/22 |
| 2021/0150230 | A1* | 5/2021 | Smolyanskiy ......... G06V 20/56 |
| 2021/0237774 | A1* | 8/2021 | Tang .................. G06T 7/248 |
| 2021/0304438 | A1* | 9/2021 | Ye ..................... G06N 3/08 |
| 2021/0398302 | A1* | 12/2021 | Guizilini ............... G06T 7/50 |
| 2021/0402942 | A1* | 12/2021 | Torabi ................ G06V 10/82 |
| 2023/0169677 | A1* | 6/2023 | Ilic ..................... G06T 7/73 |
| | | | 382/103 |

OTHER PUBLICATIONS

LiDAR Panoptic Segmentation for Autonomous Driving, Andres Milioto et al., IEEE, Oct. 2020, pp. 8505-8512 (Year: 2020).*
3D Point Cloud Classification for Autonomous Driving via Dense-Residual Fusion Network, Chung-Hsin Chiang et al., IEEE, Sep. 2020, pp. 163775-163783 (Year: 2020).*
PersonLab: Person Pose Estimation and Instance Segmentation with a Bottom-Up, Part-Based, Geometric Embedding Model, George Papandreou et al., CVF, 2018, pp. 1-18 (Year: 2018).*
Instance Segmentation of LiDAR Point Clouds, Feihu Zhang et al, Aug. 2020, pp. 9448-9455 (Year: 2020).*
Pose2Instance: Harnessing Keypoints for Person Instance Segmentation, Subarna Tripathi et al., arXiv, 2017, pp. 1-10 (Year: 2017).*
Huang, Shuaiyi, et al. "Dynamic Context Correspondence Network for Semantic Alignment." *Proceedings of the IEEE/CVF International Conference on Computer Vision* 2019 (10 pages in English).

* cited by examiner

METHOD AND APPARATUS WITH OBJECT POSE ESTIMATION

CROSS-REFERENCE TO RELATED APPLICATIONS

This application claims the benefit under 35 USC § 119(a) of Chinese Patent Application No. 202011446331.X, filed on Dec. 8, 2020 in the China National Intellectual Property Administration, and Korean Patent Application No. 10-2021-0139573, filed on Oct. 19, 2021 in the Korean Intellectual Property Office, the entire disclosures of which are incorporated herein by reference for all purposes.

BACKGROUND

1. Field

The following description relates to a method and apparatus with object pose estimation.

2. Description of Related Art

Artificial intelligence (AI) technologies may be implemented with technologies such as augmented reality (AR), computer vision, or map navigation in human life and work. Through pose estimation, a pose of an object in an image captured by a camera may be estimated, which is applicable to various AI technologies. The pose estimation may include an instance segmentation task and a keypoint detection task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with object pose estimation includes: determining an image feature corresponding to a point cloud of an input image; determining semantic segmentation information, instance mask information, and keypoint information of an object, based on the image feature; and estimating a pose of the object based on the semantic segmentation information, the instance mask information, and the keypoint information.

The input image may include a depth image, and the determining of the image feature may include: extracting a point cloud feature based on the depth image; and determining the point cloud feature to be the image feature.

The extracting of the point cloud feature may include: determining point cloud information corresponding to the depth image; and extracting the point cloud feature based on any one or any combination of any two or more of the point cloud information, a color feature, and a normal feature.

The input image further may include either one or both of a color image and a grayscale image, and the determining of the image feature may include: extracting a first image feature based on either one or both of the color image and the grayscale image; and determining the image feature by fusing the point cloud feature and the first image feature.

The determining of the image feature by fusing the point cloud feature and the first image feature may include determining the image feature by pixel-wise fusing the point cloud feature and the first image feature.

The determining of the semantic segmentation information, the instance mask information, and the keypoint information based on the image feature may include: determining the semantic segmentation information corresponding to the point cloud based on the image feature; generating a three-dimensional (3D) grid based on point cloud information corresponding to the input image and determining the instance mask information based on the 3D grid; and determining the keypoint information using the instance mask information or using the semantic segmentation information and the instance mask information.

The instance mask information may indicate grid information corresponding to the point cloud in the 3D grid, and network information corresponding to each point cloud of the object may be determined based on grid information corresponding to a point cloud of a center of the object.

The generating of the 3D grid based on the point cloud information may include any one or any combination of any two or more of: determining a 3D grid by dividing a 3D space corresponding to the point cloud information at equal intervals; determining multiple 3D grids by dividing the 3D space corresponding to the point cloud information into different intervals; and determining multiple 3D grids by dividing the 3D space corresponding to the point cloud information based on same division starting points of different intervals.

The determining of the keypoint information using the instance mask information may include either one or both of: estimating a first offset of a keypoint corresponding to each point cloud based on the image feature and determining the keypoint information through regression based on the first offset and the instance mask information; and estimating a second offset of a keypoint corresponding to each point cloud in each cell of the 3D grid based on the image feature and the instance mask information, and determining the keypoint information through regression based on the second offset.

The estimating of the second offset and the determining of the keypoint information through the regression based on the second offset may include determining a target predicted value of a key point predicted based on a point cloud, based on the second offset and the point cloud information, and determining the keypoint information through regression based on the target predicted value.

The determining of the target predicted value and the determining of the keypoint information through the regression based on the target predicted value may include any one or any combination of any two or more of: for each keypoint of the object, determining an average value of a target predicted value corresponding to a keypoint and each point cloud, as keypoint information; for each keypoint of the object, determining a weighted average value of a probability value corresponding to each point cloud in the instance mask information and a target predicted value corresponding to a keypoint and each point cloud, as keypoint information; for each keypoint of the object, determining a weighted average value of a target predicted value corresponding to a keypoint and a point cloud of a preset value closest to a central point of the object and a probability value corresponding to the point cloud of the preset value in the instance mask information, as keypoint information of the object; and for each keypoint of the object, determining a weighted average value of a distance approximate value corresponding to a keypoint and each point cloud, a target predicted value corresponding to a keypoint and each point cloud, and a probability value corresponding to each point cloud in the instance mask information, as keypoint information.

The determining of the keypoint information using the semantic segmentation information and the instance mask information may include: determining instance segmentation information based on the semantic segmentation information and the instance mask information; estimating a first offset of a keypoint corresponding to each point cloud based on the image feature; and determining the keypoint information through regression based on the first offset and the instance segmentation information.

The determining of the keypoint information through the regression based on the first offset and the instance segmentation information may include: determining an initial predicted value of a keypoint predicted based on a point cloud, based on the first offset and the point cloud information; determining a target predicted value of a keypoint in the 3D grid based on the initial predicted value and the instance mask information; and determining the keypoint information through regression based on the target predicted value.

The determining of the keypoint information through the regression based on the first offset and the instance segmentation information may include: determining an initial predicted value of a keypoint predicted based on a point cloud, based on the first offset and the point cloud information; determining a target predicted value of a keypoint in the 3D grid based on the initial predicted value and the instance segmentation information; and determining keypoint information of an object through a regression scheme based on the target predicted value.

In another general aspect, one or more embodiments include a non-transitory computer-readable storage medium storing instructions that, when executed by a processor, configure the processor to perform any one, any combination, or all operations and methods described herein.

In another general aspect, an apparatus with object pose estimation includes: a processor configured to: determine an image feature corresponding to a point cloud of an input image; determine semantic segmentation information, instance mask information, and keypoint information of an object, based on the image feature; and estimate a pose of the object based on the semantic segmentation information, the instance mask information, and the keypoint information.

For the determining of the semantic segmentation information, the instance mask information, and the keypoint information, the processor may be configured to: determine the semantic segmentation information corresponding to the point cloud based on the image feature; generate a three-dimensional (3D) grid based on point cloud information corresponding to the input image and determine the instance mask information based on the 3D grid; and determine the keypoint information using the instance mask information or using the semantic segmentation information and the instance mask information, the instance mask information may indicate grid information corresponding to the point cloud in the 3D grid, and network information corresponding to each point cloud of the object may be determined based on grid information corresponding to a point cloud of a center of the object.

For the determining of the keypoint information using the instance mask information, the processor may be configured to: estimate a first offset of a keypoint corresponding to each point cloud based on the image feature; estimate a second offset of a keypoint corresponding to each point cloud in each cell of the 3D grid based on the image feature and the instance mask information; and determine the keypoint information through either one or both of regression based on the first offset and the instance mask information and regression based on the second offset.

The apparatus may include a memory storing instructions that, when executed by the processor, configure the processor to perform the determining of the image feature, the determining of the semantic segmentation information, the instance mask information, and the keypoint information, and the estimating of the pose.

In another general aspect, an electronic device includes: a camera configured to generate an input image; and a processor configured to: determine an image feature corresponding to a point cloud of the input image; determine semantic segmentation information, instance mask information, and keypoint information of an object, based on the image feature; and estimate a pose of the object based on the semantic segmentation information, the instance mask information, and the keypoint information.

For the determining of the semantic segmentation information, the instance mask information, and the keypoint information, the processor may be configured to: determine the semantic segmentation information corresponding to the point cloud based on the image feature; generate a three-dimensional (3D) grid based on point cloud information corresponding to the input image and determine the instance mask information based on the 3D grid; and determine the keypoint information using the instance mask information or using the semantic segmentation information and the instance mask information, the instance mask information may indicate grid information corresponding to the point cloud in the 3D grid, and network information corresponding to each point cloud of the object may be determined based on grid information corresponding to a point cloud of a center of the object.

In another general aspect, a processor-implemented method with object pose estimation includes: determining an image feature based on three-dimensional (3D) space information corresponding to an input image; determining semantic segmentation information based on the image feature; determining instance mask information based on the 3D space information; determining keypoint information based on the instance mask information; and determining a pose of an object based on the semantic segmentation information, the instance mask information, and the keypoint information.

The 3D space information may include point cloud information.

The determining of the keypoint information may include: estimating, for each point cloud of the point cloud information, an offset of a keypoint based on the image feature; and determining the keypoint information through regression based on the offsets.

Other features and aspects will be apparent from the following detailed description, the drawings, and the claims.

Figure 1:
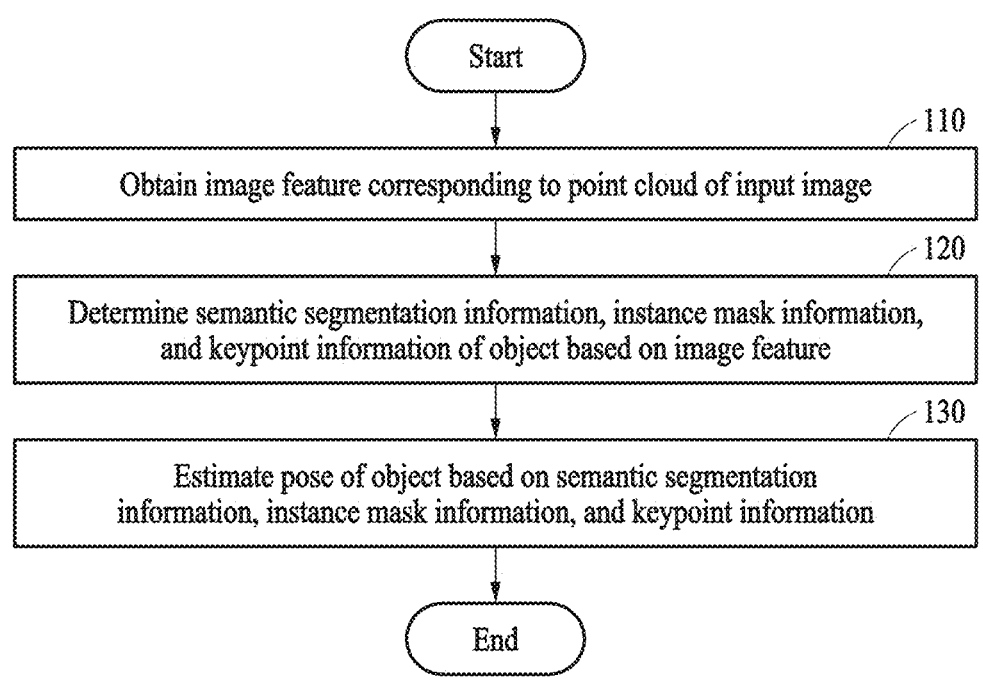
FIG. 1 is a flowchart illustrating an example of a method of estimating a pose of an object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein, including technical or scientific terms, have the same meaning as commonly understood by one of ordinary skill in the art to which this disclosure pertains after and understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Examples may be associated with a field of augmented reality (AR) technologies, and more particularly, with image processing and recognition technologies of multiple modes (color and depth) based on a learning algorithm, object recognition, instance segmentation, and six degrees of freedom (6DoF) object pose estimation technologies.

AR may be a technology of augmenting the real world by calculating a position and an angle of a camera image in real time and displaying information about a real object and/or a virtual object generated by a computer to be superimposed on a scene in the real world. AR technology may provide an experience of real world information to a user by adding virtual content to a real scene in front of the user. To complete a high-quality virtual reality fusion effect in front of a user, the AR technology may require high-precision real-time processing and understanding of a three-dimensional (3D) state of surrounding objects in a 3D space.

Pose estimation may be used to express a structure and a shape of an object using a geometric model or structure, establish a correspondence relationship between a geometric model and an image by extracting features of the object, and estimate a spatial pose of the object geometrically or using other schemes. The geometric model used herein may be a simple geometric body (such as a plane, a cylinder, or a predetermined type of geometric structures, for example) or may be a 3D model obtained by laser scanning or other schemes. Pose estimation technology may include an instance segmentation task and a keypoint detection task. The instance segmentation task may include a semantic segmentation task for determining a category of a target object by separating the target object from a background, and an instance mask segmentation task for determining a pixel point of each target object. The keypoint detection task may determine a location of a target object in an image.

Through 6DoF pose estimation technology, a 6DoF pose of a target object in an image including color and depth information may be estimated. The 6DoF pose may include a 3D location and a 3D spatial direction, and may also be referred to as a "six-dimensional freedom pose".

For object pose estimation, object 6DoF pose estimation based on a red+green+blue+depth (RGBD) image may be used. According to the above method, voting information may be predicted using a deep Hough voting network based on a keypoint of an object, a 3D keypoint of the object may be determined through a clustering scheme, and a pose of the object may be estimated using a least-squares fitting scheme. The above method may be an extension of a two-dimensional (2D) keypoint method that may maximize the use of depth information of a depth image. However, in the above method, when object instance segmentation and keypoint detection are performed using the clustering scheme, a large amount of time may be used to perform a clustering task.

In addition, through the object instance segmentation, an object may be extracted using a detection branch, or the same instance point may be collected to search for an object through clustering or grouping. However, a detection branch-based scheme may have difficulty in guaranteeing consistency of an instance label of each point, and the clustering scheme may require parameter adjustment and a large number of times of calculations. An object instance segmentation scheme using a 2D image may only require a small amount of time, but artifacts such as occlusion and overlap between images representing various objects may be present in a 2D projection image.

In contrast, object pose estimation of one or more embodiments may perform keypoint regression and object instance segmentation based on location information of a 3D space, and thus the object pose estimation of one or more embodiments may effectively reduce the use of the clustering scheme and also reduce an amount of time consumed for object pose estimation. In addition, in an image processing method of one or more embodiments, a multi-layer perceptron (MLP) network based on object instance mask segmentation may determine instance mask information of an object based on a point cloud corresponding to a center of the object. Thus, the image processing method of one or more embodiments may be used without the clustering scheme, and thus the image processing method of one or more embodiments may reduce an amount of time used for image processing.

Hereinafter, examples will be described in detail with reference to the accompanying drawings. When describing the examples with reference to the accompanying drawings, like reference numerals refer to like elements and a repeated description related thereto will be omitted.

FIG. 1 is a flowchart illustrating an example of a method of estimating a pose of an object. Referring to FIG. 1, in operation 110, an image feature corresponding to a point cloud of an input image may be obtained.

An object may have 6DoF in a 3D space and may also be referred to as a "6DoF object". The object may correspond to an object in the real world, such as a mouse, a fan, or a desk, as examples.

The input image may be, for example, an RGBD image that includes color information and/or depth information and that is collected by an image acquirer (e.g., an image sensor such as a camera). The color information may correspond to a color image and/or a grayscale image, and the depth information may correspond to a depth image. For example, the input image may include only a depth image, or may include a color image and/or a grayscale image together with the depth image. The color image, the grayscale image, and the depth image may represent the same scene. The input image may include various types of objects. A type and a number of objects are not limited. Examples are not limited to a method of acquiring a color image, a grayscale image, and a depth image. For example, a color image, a grayscale image, and a depth image may be simultaneously acquired using a general image acquirer and a depth image acquirer, or may be acquired by a single image acquirer having a function of simultaneously acquiring a color image, a grayscale image, and a depth image.

A color image or a grayscale image may be constructed and selected according to requirements of an actual application. For example, a color image may be used to obtain an enhanced pose estimation effect, or a grayscale image may be used to increase an efficiency of pose estimation. The grayscale image may represent each pixel using one sample color. The grayscale image may have various color depth levels between black and white.

In practical applications, a pose of an object may continue to be estimated in real time in various scenarios. Here, optionally, RGBD video of an object may be collected through video capturing equipment. Each frame image of a corresponding video may be an RGBD image, and a color image and a depth image may be extracted from the same video frame. For each video frame, a corresponding color image and depth image may be acquired. A color image and a depth image of the same video frame may represent the same one or more objects. For a collected color image and depth image corresponding to each video frame, a pose of an object may be estimated in real time based on a method provided according to the examples.

The point cloud may be a large collection of points reflecting a characteristic of a surface of an object. The point cloud may be obtained according to a laser measurement principle and a photogrammetry principle. A point cloud obtained according to the laser measurement principle may have 3D coordinates and a laser reflection intensity. A point cloud obtained according to the photogrammetry principle may have 3D coordinates and color information. A point cloud obtained by combining the laser measurement principle and the photogrammetry principle may have 3D coordinates, a laser reflection intensity, and color information. A set of points, which is referred to as a "point cloud" herein, may be obtained from spatial coordinate information of each sampling point of a surface of an object.

In operation 102, semantic segmentation information, instance mask information, and keypoint information of the object may be determined based on the image feature.

A semantic segmentation task may be separating an object from a background. A probability map of semantic segmentation may be obtained by inputting the image feature, and a prediction category of each point cloud may be determined based on the probability map of the semantic segmentation.

An instance mask segmentation task may indicate determining a location of each object in an image. Instance mask segmentation may correspond to object detection. A probability map for different locations of instance segmentation may be obtained by inputting the image feature, and a location of an object corresponding to each point cloud may be determined based on the probability map.

Since the instance mask segmentation task includes processing of a location of an object, instance mask segmentation according to the examples may be mainly performed based on point cloud information provided in the image feature and other image feature information. The point cloud information may include information to specify spatial coordinate values of a point cloud.

The keypoint information may be determined based on the instance mask information of the object. In addition, the keypoint information may be determined based on the semantic segmentation information and the instance mask information. For example, in operation 120, a spatial coordinate value of a keypoint may be obtained.

A keypoint of an object may be, for example, an artificially defined keypoint, or a keypoint obtained by performing calculation through farthest point sampling (FPS).

In operation 130, a pose of the object may be estimated based on the semantic segmentation information, the instance mask information, and the keypoint information.

Based on the semantic segmentation information, the instance mask information, the keypoint information, and a geometric model (e.g., a computer-aided design (CAD) model) of the same object, a 6DoF pose of an object obtained by 3D rotation and 3D translation transformation between 3D keypoints of two sets may be calculated through the least-squares fitting scheme.

Figure 2:
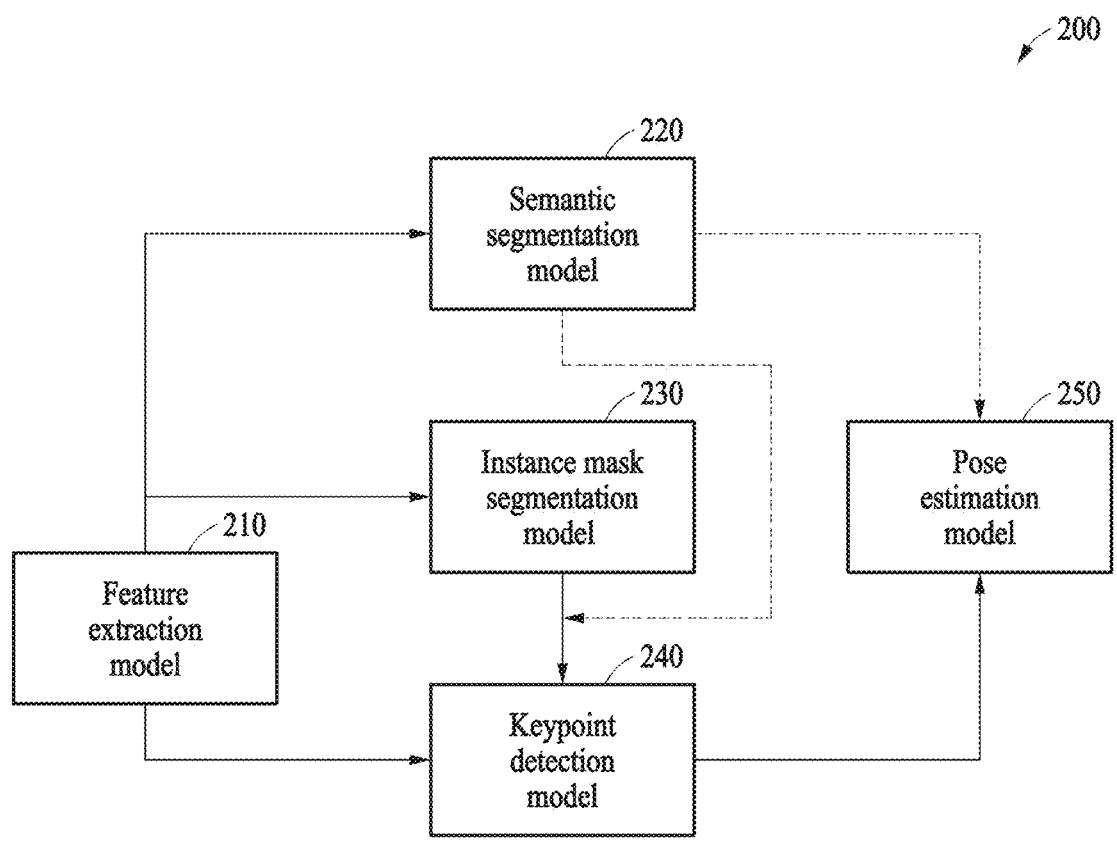
FIG. 2 illustrates an example of object pose estimation.

In an example, operations 110 through 130 may be implemented through a network 200 of FIG. 2. As shown in FIG. 2, the network 200 may include a feature extraction model 210, a semantic segmentation model 220, an instance mask segmentation model 230, a keypoint detection model 240, and a pose estimation model 250. The feature extraction model 210 may extract an image feature corresponding to a point cloud of an input image. The semantic segmentation model 220 may determine semantic segmentation information (for example, a semantic category of a point cloud) of an object based on the image feature. The instance mask segmentation model 230 may determine instance mask information based on the image feature. The keypoint detection model 240 may determine a keypoint (e.g., spatial coordinate information of the keypoint) by combining the image feature with mask information (or the instance mask information and the semantic segmentation information). The pose estimation model 250 may determine an object and pose information corresponding to the object based on the keypoint (or keypoint information and semantic segmentation information). The semantic segmentation model 220, the instance mask segmentation model 230, and the keypoint detection model 240 may form a location-aware semantic segmentation network, an instance mask segmentation network, and a location-aware 3D keypoint regression network, based on a location-aware MLP network, respectively.

According to one or more embodiments, an image feature corresponding to a point cloud may be extracted from an image of an object. The image feature may include point cloud information. Since a point and a surface of the object do not overlap or occlude each other in a 3D space, a location and integrity of the object may be recognized using 3D location information. According to the one or more embodiments, keypoint information of each object may be quickly calculated using a regression scheme instead of using complex clustering, based on semantic segmentation information and instance mask segmentation information of objects detected based on 3D location information. Accordingly, the one or more embodiments may reduce an amount of time for calculation and enhance an efficiency of keypoint detection. A 6DoF pose of an object may be calculated using a least-squares fitting scheme based on predicted keypoint information and keypoint information of a 3D model of the object. In addition, a method of estimating a pose of an object of one or more embodiments may enhance an efficiency, an accuracy, and robustness of a system in an AR application. An end-to-end trainable network may be formed by connecting instance segmentation and regression networks of 3D keypoints, and accordingly the one or more embodiments may avoid parameter adjustment in a plurality of post-processing operations (e.g., voting clustering).

In an example, operation 110 may include either one or both of the following operations A1 and A2:

A1: extracting a point cloud feature based on a depth image and determining the point cloud feature to be an image feature; and A2: extracting a first image feature based on either one or both of a color image and a grayscale image, extracting a point cloud feature based on a depth image, and fusing the point cloud feature and the first image feature to obtain an image feature.

According to examples, an image feature may be extracted based on a depth image. In another example, an image feature may be extracted based on a color image and/or a grayscale image, and a depth image. In this example, the image feature may be extracted using, for example, an image feature extraction network or an image feature extraction algorithm.

In an example, features may be extracted based on a color image and/or a grayscale image, and a depth image, and image features may be extracted through an image feature extraction network. In this example, a color image and/or a grayscale image, and a depth image may correspond to an input image of the image feature extraction network. When the input image is a color image, an input of the image feature extraction network may be an image with four channels of H×W obtained through pixel-wise splicing of the color image and the depth image. Here, H and W may represent a height and a width of the image, respectively. The four channels may be three channels corresponding to RGB data of the color image and a channel corresponding to depth data of the depth image, and an output of the image feature extraction network may include an image feature vector of each pixel.

Point cloud features may be extracted based on the depth image. Point cloud data corresponding to the depth image may be obtained through point cloud transformation (e.g., conversion of a 2D image into a 3D image) of the depth image, and point cloud features may be extracted based on the point cloud data to obtain a point cloud feature corresponding to the depth image. In this example, the point cloud features may be extracted through a point cloud feature extraction network. An input of the point cloud feature extraction network may be point cloud data, and an output of the point cloud feature extraction network may include a point cloud feature vector of each 3D point. Thus, a point cloud feature vector of each pixel may be obtained.

Figure 3:
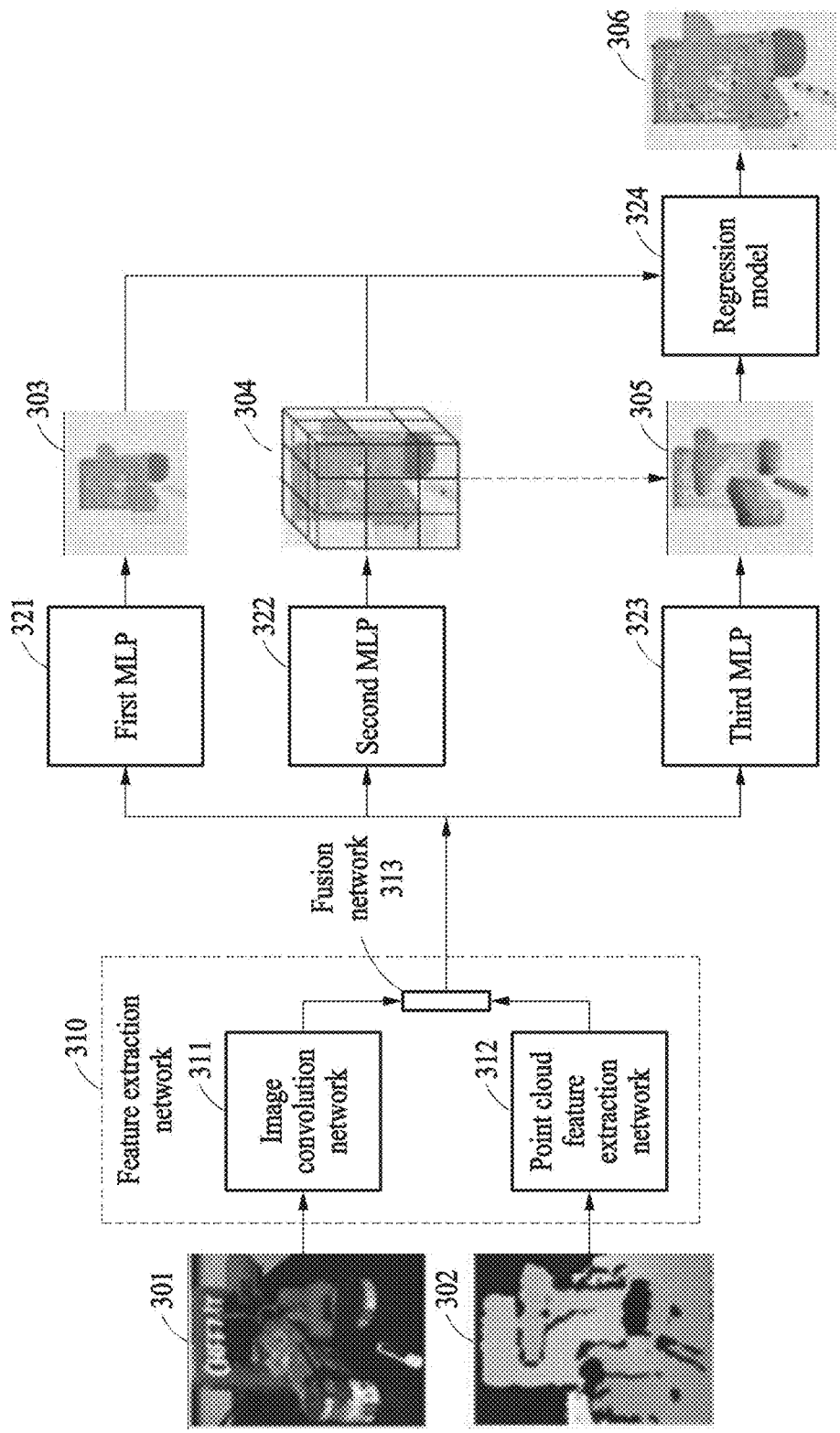
FIG. 3 illustrates an example of a network structure for object pose estimation.
Figure 4:
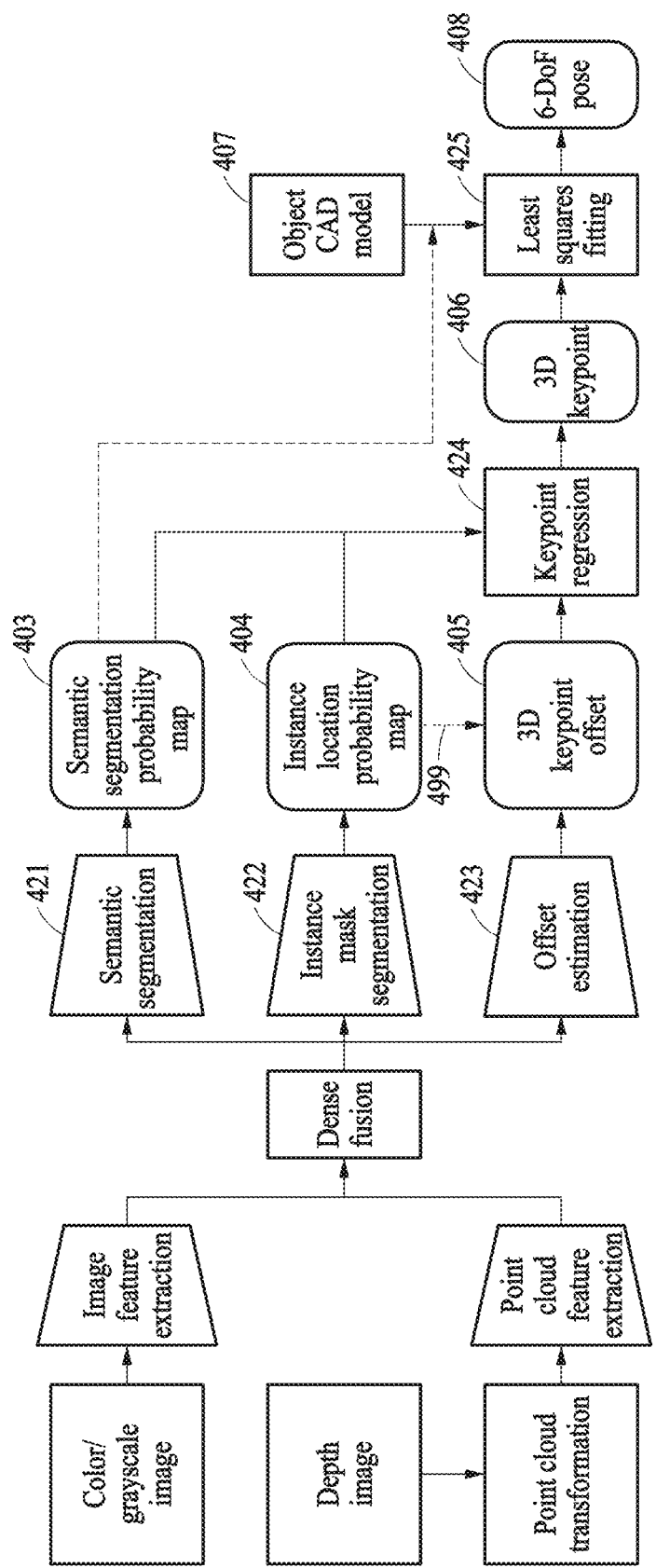
FIG. 4 illustrates an example of object pose estimation.

In an example, operation A2 may be implemented based on a network structure of FIG. 3 and/or a flowchart of FIG. 4. Referring to FIG. 3, a feature extraction network 310 may include an image convolution network 311, a point cloud feature extraction network 312, and a fusion network 313. A path 499 of FIG. 4 may represent other example network structures. For example, an instance location probability map 404 may be used for a keypoint regression task 424 together with a 3D keypoint offset 405, based on the path 499. Operation A2 may include the following operation A21:

A21: extracting the first image feature through a convolution network based on the input color image and/or grayscale image.

The image convolution network 311 may be a deep learning network based on convolutional neurons, and input data of the image convolution network 311 may be a color image 301 with three channels in a size of H×W. The grayscale image may be used instead of or together with the color image 301. H may be an image height, W may be an image width, and the three channels may correspond to RGB of the color image 301. Output data of the image convolution network 311 may include an image feature vector map (e.g., a first image feature) of each pixel having a size of H×W×F1. In an example, the image convolution network 311 may be a multi-layer convolutional neural network (CNN) constructed according to requirements of a real scene, or a front portion of a fully connected layer of a neural network, such as an AlexNet, a visual geometry group net (VGG net), or a deep residual network (ResNET).

Operation A2 may include the following operation A22:

A22: extracting the point cloud feature through an MLP network based on an input depth image.

For example, the point cloud feature extraction network 312 may be an MLP network, such as PointNet++, which is a segmentation algorithm network. Input data of the point cloud feature extraction network 312 may be a point cloud obtained through a projection of a depth image 302 from 2D to 3D, or may include other features, such as RGB colors and normal vectors, of each point cloud. The input data may have a size of N×M. N may be a number of point clouds, and M may be a length of each point cloud feature. Output data of the point cloud feature extraction network 312 may include a point cloud feature vector of each 3D point. The output data may have a size of N×F2.

In an example, operation A2 may include the following operation A23:

A23: pixel-wise fusing the first image feature and the point cloud feature to obtain the image feature corresponding to the point cloud.

According to a one-to-one correspondence between the depth image 302 and a 3D point cloud projection, an image pixel corresponding to each 3D point may be determined. In an example, each pixel of an image may pass through the image convolution network 311 to obtain a pixel feature vector (e.g., the first image feature), and a point cloud feature vector (e.g., the point cloud feature) may be obtained by pixels passing through the point cloud feature extraction network 312. In this example, the pixel feature vector and the point cloud feature vector may be densely fused on a pixel-by-pixel basis through the fusion network 313. In an example, the above fusing may be splicing the pixel feature vector and the point cloud feature vector. Fused features may represent the image feature corresponding to the point cloud, and may have a size of N×(F1+F2)=N×F.

In an example, the image feature may include point cloud information obtained based on a dense fusion. The image feature may be transmitted to a plurality of MLP networks in parallel and used to extract a more expressive feature. The plurality of MLP networks may include a location-aware network. The plurality of MLP networks may be implemented using a network structure including a first MLP 321, a second MLP 322, and a third MLP 323 of FIG. 3, and may perform a task shown in FIG. 4. The task may include a semantic segmentation task 421 of an object, an instance mask segmentation task 422, an offset estimation task 423 of a 3D keypoint of the object, and a coordinate estimation task (e.g., a keypoint regression task 424) of the 3D keypoint of the object. A loss function may be defined for training of each task. In addition, the semantic segmentation task 421, the instance mask segmentation task 422, and a keypoint detection task that includes the offset estimation task 423 and the keypoint regression task 424 may belong to parallel tasks. Hereinafter, examples of various tasks based on the image feature corresponding to the point cloud obtained in operation 110 will be described.

In an example, operation 120 may include operations B1 through B3 that will be described below.

B1: determining semantic segmentation information corresponding to the point cloud based on the image feature.

The semantic segmentation task 421 may be performed based on the first MLP 321, and a semantic category of each point cloud may be estimated through the semantic segmentation task 421. In an example, when the semantic category (e.g., a category of a preset object) has class C or when "C" objects are present, a goal of a task may be to output semantic segmentation probability maps 303 and 403 with a size of N×C. In this example, each value of the semantic segmentation probability maps 303 and 403 may represent a probability that an n-th point cloud belongs to class C. During network training, when a ground truth (e.g., actual semantic information of each point cloud) is configured based on semantic label information, a value of a preset loss function may be determined based on a network output and label information, and a network parameter may be updated based on the loss function. The loss function may be a dice loss (e.g., a metric function used to evaluate a similarity of two samples), a softmax loss, and the like. When a network converges through continuous monitoring of data with label information, network parameters of semantic segmentation may be trained. In testing and using, the image convolution network 311 and the point cloud feature extraction network 312 may be executed based on an RGBD image to obtain a corresponding image feature, and the first MLP 321 may be executed based on the image feature to obtain the semantic segmentation probability maps 303 and 403. A category corresponding to a maximum probability of each point cloud in the semantic segmentation probability maps 303 and 403 may be adopted or determined as a predicted semantic category of a point cloud as semantic segmentation information corresponding to the point cloud.

B2: generating a 3D grid based on point cloud information corresponding to the input image, and determining instance mask information of an object based on the 3D grid.

Figure 8:
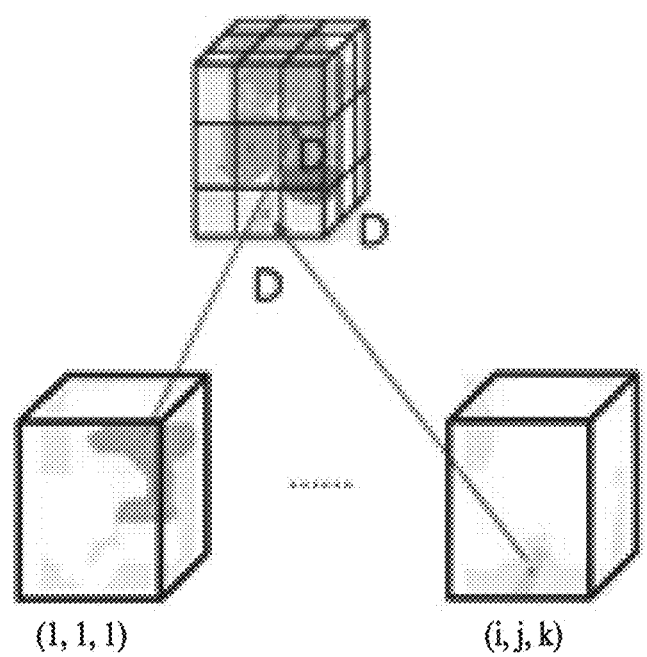
FIG. 8 illustrates an example of instance mask segmentation based on location awareness.

As shown in FIG. 8, a generation of a 3D grid may correspond to dividing a 3D space in which an object is located into small 3D space cells. When a center of the object is in a cell of the 3D grid, related information obtained from the cell may be used for 3D keypoint detection and instance segmentation of the object.

Specifically, the instance mask segmentation task 422 may be performed using the second MLP 322. A location of each instance according to 3D location information may be recognized and predicted through the instance mask segmentation task 422. In an example, as shown in FIG. 3, a single 3D space may be generated based on locations of all input point clouds. In this example, the point cloud may have a size of N×3. N may represent a number of point clouds, and 3 may represent 3D spatial coordinates in a horizontal direction x, a vertical direction y, and a depth direction z of each point cloud. The 3D space may be divided into 3D grids through a preset 3D grid meshing strategy. For example, when a 3D grid meshing strategy of dividing a single branch at equal intervals is used, in a network training process, a network node corresponding to a cell in which the center of the object is located may be set to "1", the others may be set to "0", a value of a loss function may be determined based on a network output and label information, and network parameters may be updated through the loss function. In this example, the loss function may be a dice loss, a softmax loss, and the like. When a network converges through continuous monitoring of data with label information, network parameters of semantic segmentation may be trained. In testing and using, a probability map of each location of instance segmentation (for example, instance location probability maps 304 and 404) may be obtained by executing the second MLP 322 based on image features according to the RGBD image. A location corresponding to a maximum probability of each point cloud in the instance location probability maps 304 and 404 may be determined to be a location of an object corresponding to a corresponding point cloud as instance mask information. All point clouds at each cell location may be regarded as the same instance object.

In an example, the instance mask information may be grid information corresponding to a point cloud in a 3D grid. Network information corresponding to each point cloud of an object may be determined based on grid information corresponding to a point cloud of a center of the object.

In the 3D grid generated based on the point cloud information, each point cloud of the object may be scattered in a plurality of cells of the 3D grid, and corresponding grid information of each point cloud of the object in the 3D grid may be identified. According to the examples, when a target cell in which a point cloud corresponding to a center of an object is located is determined, it may be determined that point clouds of the object uniformly correspond to the target cell. For example, in a 3D grid (the horizontal direction x, the vertical direction y, and the depth direction z), an object may include three point clouds corresponding to each other. Although the actual number of point clouds may be greater than three, an example of three point clouds is described for convenience. A first point cloud may correspond to a first cell, a third cell, and a fifth cell, a second point cloud may correspond to a sixth cell, a seventh cell, and an eighth cell, and a third point cloud may correspond to a second cell, a fourth cell, and a seventh cell. When a center of a current object corresponds to the second point cloud, the sixth cell, the seventh cell, and the eighth cell may be determined to be cells corresponding to all the three point clouds. A channel corresponding to a corresponding cell may be used to predict a location of the object.

B3: determining the keypoint information using the instance mask information or using the semantic segmentation information and the instance mask information.

In an example, when the semantic segmentation information (e.g., a predicted semantic category corresponding to each point cloud) and the instance mask information (e.g., a location of an object based on a location of each point cloud) are obtained through operations B1 and B2, the keypoint information may be determined based on the image feature and the instance mask information. In another example, the keypoint information may be determined based on an image feature combined with the semantic segmentation information and the instance mask information. Hereinafter, examples of determining keypoint information will be further described.

Figure 9:
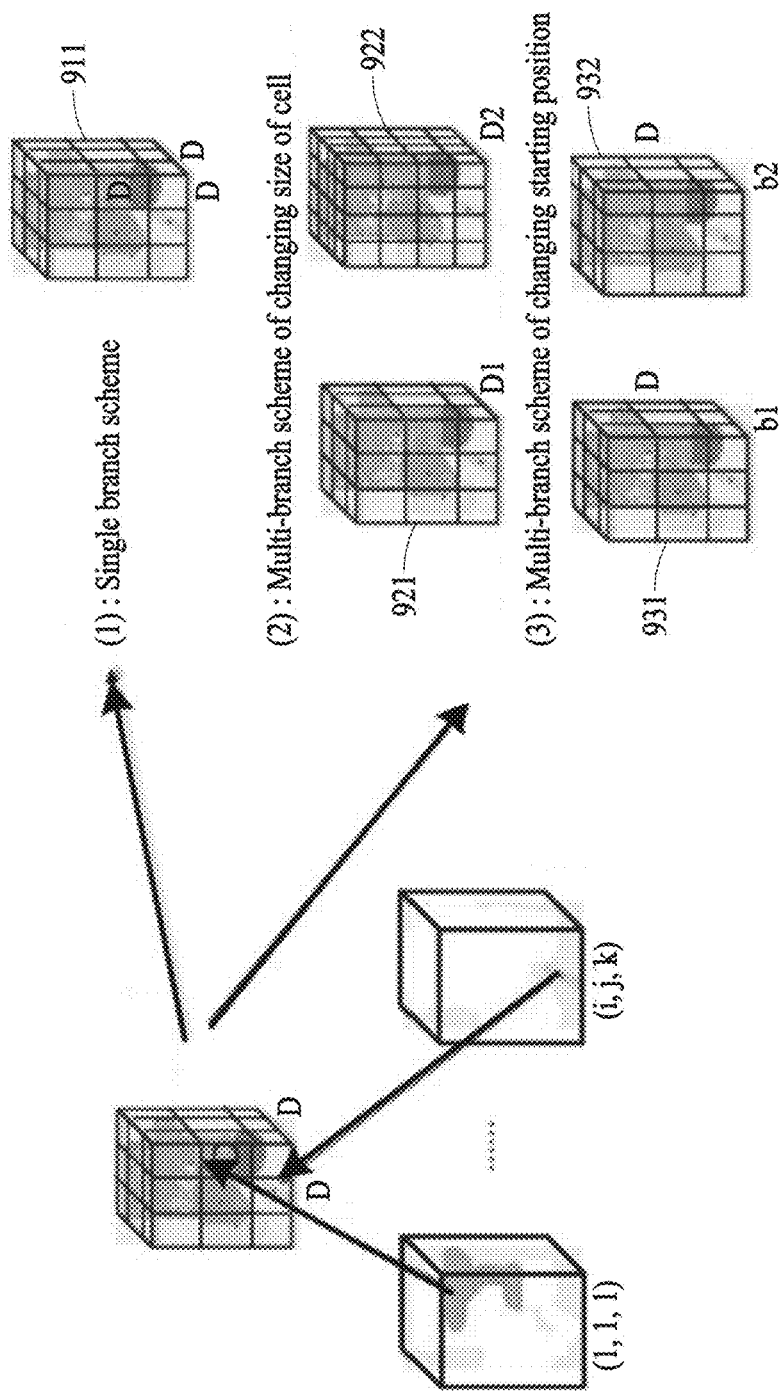
FIG. 9 illustrates an example of instance mask segmentation based on location awareness.

In an example, as shown in FIG. 9, the preset 3D grid meshing strategy may include a single branch scheme based on division at equal intervals, a multi-branch scheme of changing a size of a cell, and a multi-branching scheme of changing a starting position. Operation B2 may include any one or any combination of any two or more of operations B21 through B23 that will be described below.

B21: obtaining a 3D grid by dividing a 3D space corresponding to the point cloud information at equal intervals.

Operation B21 may be referred to as a "single branch scheme". The 3D space corresponding to the point cloud information may be a 3D physical space in which an object is located. The 3D space may be divided into "D" portions at equal intervals in each direction, and accordingly a 3D grid 911 may include "D×D×D" cells. A number of nodes of the second MLP 322 may be "N×D$^3$". N may be a number of point clouds. When a center of an object is at a location of a cell (i, j, k), the object may correspond to an "i×D×D+ j×D+k-th" node (idx=i×D×D+j×D+k) of a network layer of the second MLP 322. In the above division scheme, a cell may be defined to be smaller than an arbitrary object, thereby preventing two objects from being located in the same cell. When an object is extremely small, a value of D may increase, so that a number of network parameters may increase. The increase in the number of network parameters may be advantageously limited through a multi-branch scheme such as operations B22 and B23.

B22: obtaining multiple 3D grids by dividing the 3D space corresponding to the point cloud information into different intervals.

Operation B22 may be referred to as a "multi-branch scheme of changing a size of a cell size". For example, in operation B22, different intervals may be preset for each branch, and accordingly a number of D portions may be determined. In an example, as shown in FIG. 9, one or more branches, for example, two branches may be set. The two branches may correspond to two parallel location-aware layers. Different intervals may be set for each layer. In other words, D obtained for each layer may be different, for example, D1 and D2. Two layers may include "N×D1$^3$" network nodes and "N×D2$^3$" network nodes, respectively. N may be a number of point clouds. As shown in FIG. 9, a first 3D grid 921 of a first branch may include "D1×D1×D1" cells obtained by dividing the 3D space at equal intervals based on a preset first interval, and a second 3D grid 922 of a second branch may include "D2×D2×D2" cells obtained by dividing the 3D space at equal intervals based on a second preset interval.

B23: obtaining multiple 3D grids by dividing the 3D space corresponding to the point cloud information based on the same division starting points of different intervals.

Operation B23 may be referred to as a "multi-branch scheme of changing a starting position". Specifically, in operation B23, different starting points may be set for a grid division of each branch. In an example, as shown in FIG. 9, one or more branches, for example, two branches may be set. The two branches may correspond to two parallel location-aware layers. Different starting points and equal intervals may be set for each layer. Two layers may include "N×D$^3$" network nodes. As shown in FIG. 9, a first 3D grid 931 and a second 3D grid 932 may be obtained by dividing the 3D space into a plurality of cells at preset equal intervals, but shapes of cells formed in the first 3D grid 931 and the second 3D grid 932 may be different from each other.

In an example, the offset estimation task 423 of the keypoint may be performed before the keypoint regression task 424, and a 3D keypoint 406 according to the keypoint regression task 424 may be obtained based on a 3D keypoint offset 405 according to the point cloud information. The offset estimation task 423 may be performed to estimate an offset of each point cloud for each 3D keypoint of an object. The 3D keypoint of the object may be defined based on empirical values or calculated based on a related sampling algorithm. Hereinafter, a number of keypoints of each object in an image may be assumed to be "K". Based on the semantic segmentation probability map 403, the instance location probability map 404, the 3D keypoint 406, and a geometric model (e.g., an object CAD model 407) of the same object, a 6DoF pose 408 of the object may be determined through a least-squares fitting task 425.

Operation B3 may include either one or both of operations C1 and C2 that will be described below.

C1: estimating a first offset of a keypoint corresponding to each point cloud based on the image feature, and determining the keypoint information through regression based on the first offset and the instance mask information.

According to the examples, when each object in an image corresponds to "K" keypoints, a layer of a network (e.g., the third MLP 323 of FIG. 3) for performing the 3D keypoint offset estimation task 423 may have a size of "N×K×3." N may represent a number of point clouds, K may represent a number of keypoints, and 3 may represent three coordinates of a 3D space. During training of a network, a difference between preset spatial coordinate information of a keypoint and a spatial coordinate value of each point cloud may be set as a label of an offset, and a loss function (e.g., a Euclidean distance) may be defined based on a label and a prediction representation of an object obtained in a network task. Network parameters may be updated based on the loss function.

Operation C1 may include determining an initial predicted value of a keypoint predicted based on a point cloud, based on the first offset and the point cloud information, determining a target predicted value of a keypoint in the 3D grid based on the initial predicted value and the instance mask information, and determining keypoint information of an object through regression based on the target predicted value.

The first offset predicted through each point cloud for each keypoint may be added to the original coordinate information of each point cloud, and accordingly coordinate information (e.g., an initial predicted value) of each keypoint predicted based on each point cloud may be obtained. According to the examples, a keypoint may be a 3D keypoint, and the original coordinate information may be known based on the point cloud information. The initial predicted value may correspond to a sum of the first offset and the point cloud information.

When the offset estimation task 423 is performed on the entire 3D space in operation C1, instance mask information may be added in the keypoint regression task 424 to calculate keypoint spatial coordinate information of an object output from each cell. As shown in FIG. 3, an instance mask segmentation result and an offset estimation result may be used as input data of a regression model 324. In addition, as shown in FIG. 3, the regression model 324 may be connected to the first MLP 321, the second MLP 322, and the third MLP 323. A target predicted value of each keypoint predicted by a point cloud of each cell may be determined based on the initial predicted value and the instance mask information.

C2: estimating a second offset of a keypoint corresponding to each point cloud in each cell of the 3D grid based on the image feature and the instance mask information, and determining the keypoint information through regression based on the second offset.

According to the examples, when each object in the image corresponds to "K" keypoints, a layer of a network (e.g., the third MLP 323 of FIG. 3) for performing the 3D keypoint offset estimation task 423 may have a size of N×D³×K×3. N×D³×K×3 may correspond to calculation of an offset of each keypoint corresponding to each point cloud of each cell. N may represent a number of point clouds, K may represent a number of keypoints, and 3 may represent three coordinates of a 3D space. During training of a network, a difference between preset spatial coordinate information of a keypoint and a spatial coordinate value of each point cloud may be set as a label of an offset, and a loss function (e.g., a Euclidean distance) may be defined based on a label and a prediction representation of an object obtained in a network task. Network parameters may be updated based on the loss function.

Unlike operation C1, in operation C2, an offset may be estimated for each point cloud included in each cell. In operation C1, an offset may be estimated for all point clouds based on a 3D space in which an object is located.

Operation C2 may include determining a target predicted value of a keypoint predicted based on a point cloud, based on the second offset and the point cloud information, and determining keypoint information (e.g., a spatial coordinate value) of an object through regression based on the target predicted value.

The first offset predicted through each point cloud for each keypoint may be added to the original coordinate information of each point cloud, and accordingly coordinate information (e.g., a target predicted value) of each keypoint predicted based on each point cloud may be obtained. According to the examples, a keypoint may be a 3D keypoint, and the original coordinate information may be known based on the point cloud information. The target predicted value may correspond to a sum of the second offset and the point cloud information.

Comparing operations C1 and C2, it may be found that information indicated by the first offset and the second offset is a predicted offset of each point cloud of each keypoint. In operation C1, all point clouds in the 3D space may be processed, whereas a point cloud in each cell in the 3D space may be processed in operation C2. In other words, location-aware information (e.g., instance mask information) may be added when an offset is estimated in operation C2, and accordingly when a keypoint is regressed, the target prediction value determined by the second offset and the point cloud information may be directly processed.

In operation C2, since the offset estimation task 423 is performed for each cell in the 3D space, the instance mask information may not be added in a keypoint regression operation. In association with the path 499 of FIG. 4, an estimation result for the 3D keypoint offset 405 may be used in the keypoint regression task 424, as shown in FIG. 4, and the third MLP 323 and the regression model 324 may be connected, as shown in FIG. 3.

Figure 5:
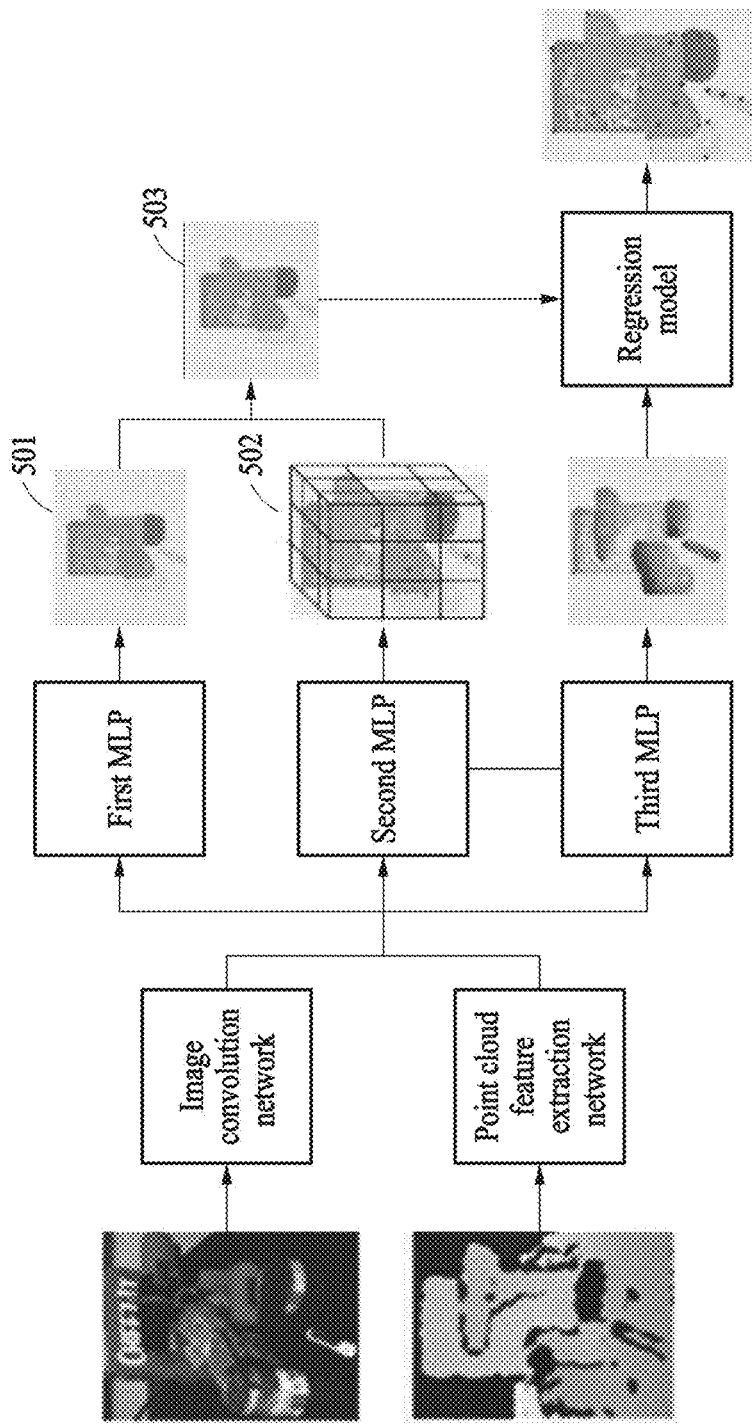
FIG. 5 illustrates an example of a network structure for object pose estimation.
Figure 6:
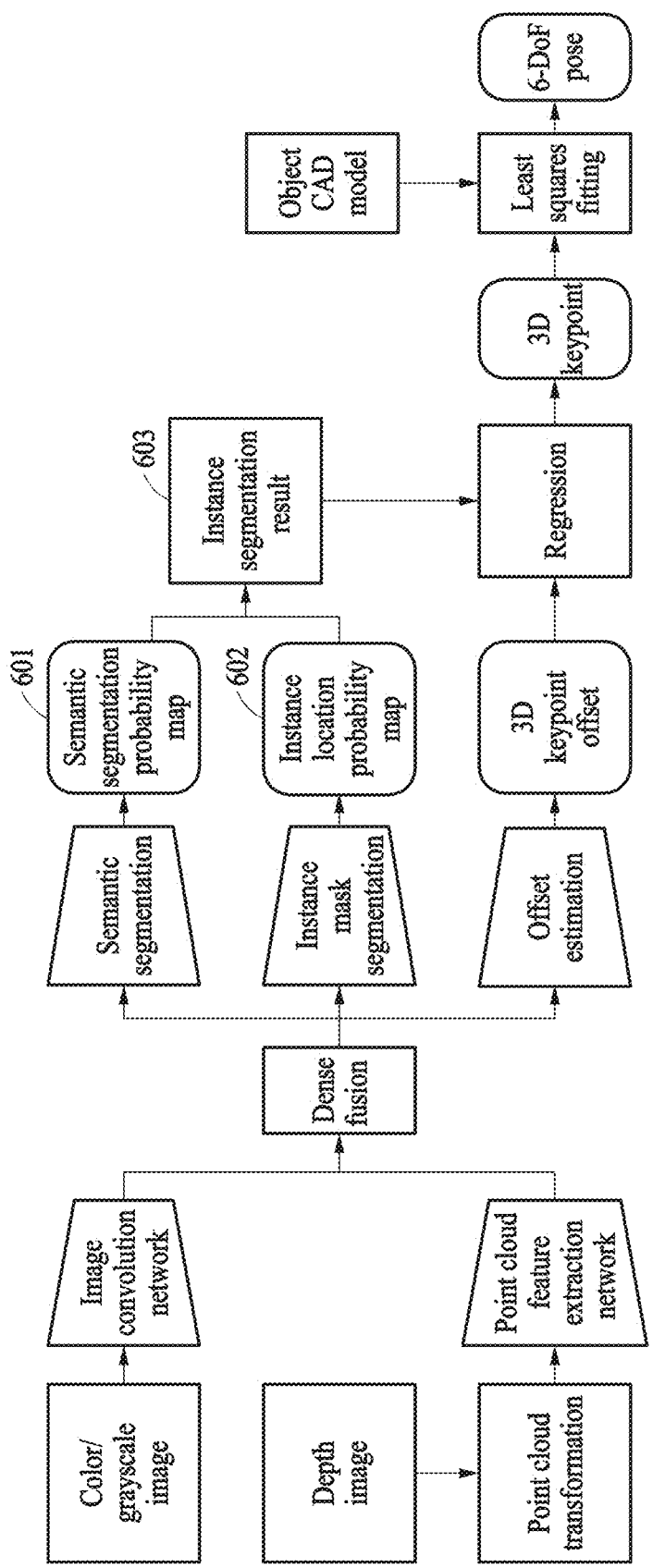
FIG. 6 illustrates an example of object pose estimation.
Figure 7:
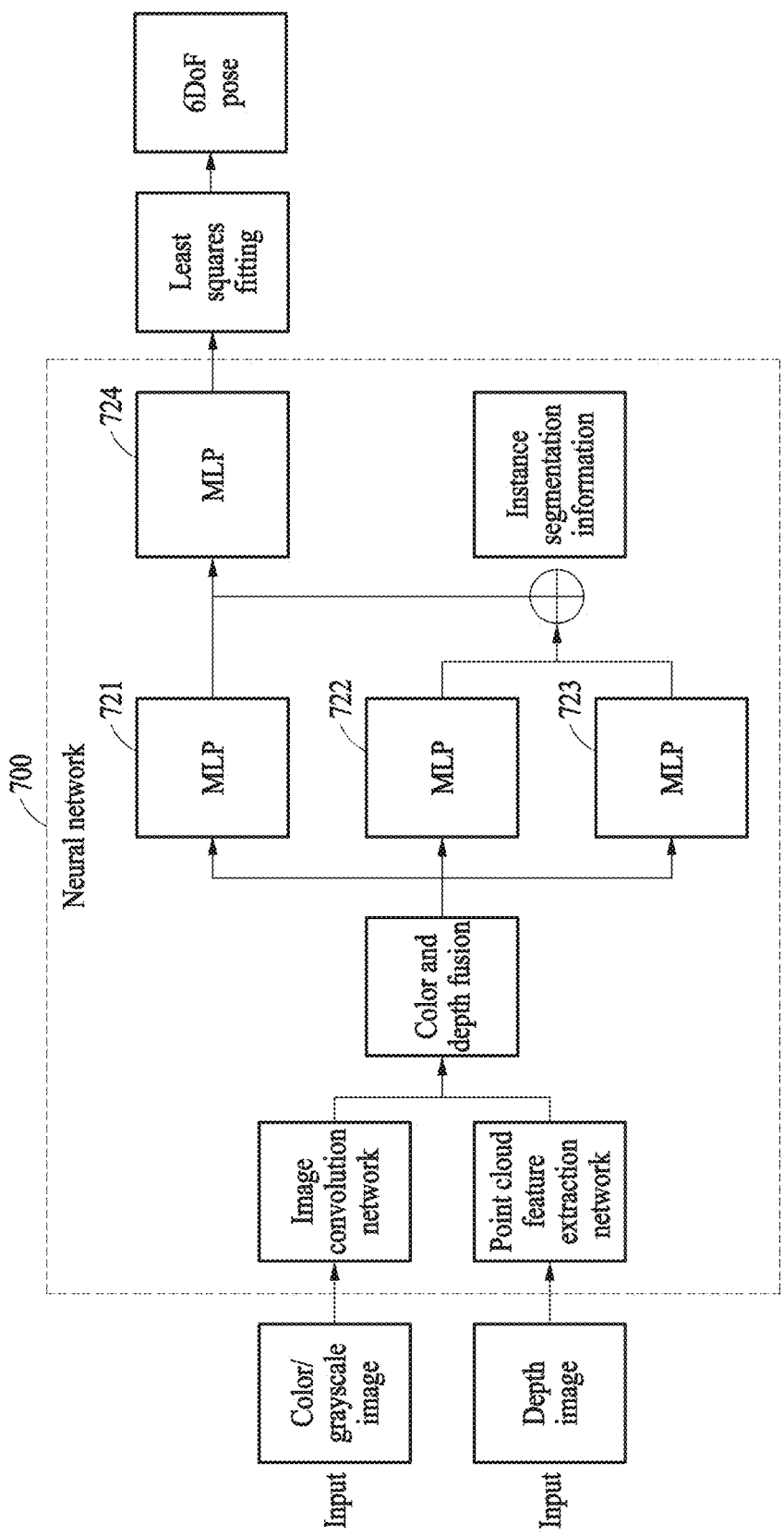
FIG. 7 illustrates an example of object pose estimation.

In an example, as shown in FIGS. 5, 6, and 7, operation B3 may include the following operation C3.

C3: determining instance segmentation information based on the semantic segmentation information and the instance mask information, estimating a first offset of a keypoint corresponding to each point cloud based on the image feature, and determining keypoint information of an object through regression based on the first offset and the instance segmentation information.

The semantic segmentation information may indicate a category corresponding to each point cloud, and the instance mask information may indicate a cell (e.g., a cell corresponding to an object) corresponding to each point cloud in a 3D grid. The instance segmentation information determined based on the semantic segmentation information and the instance mask information may be used to specify a category of an object and location information of the object. A neural network 700 of FIG. 7 may perform end-to-end segmentation and 3D keypoint regression. The semantic segmentation information may be obtained by processing fused image features through an MLP 722 for semantic segmentation calculation as shown in FIG. 7. The instance mask information may be obtained by processing the fused image features through an MLP 723 for location-aware 3D instance segmentation as shown in FIG. 7.

A process of determining the instance segmentation information based on the semantic segmentation information and the instance mask information may correspond to a process of removing unnecessary information from the instance mask information using the semantic segmentation information by excluding redundant information. An estimation result (e.g., a probability map 501 of FIG. 5, and a probability map 601 of FIG. 6) corresponding to the semantic segmentation information may be a matrix with a size of "N×C", and estimation results (e.g., a probability map 502 of FIG. 5, and a probability map 602 of FIG. 6) corresponding to the instance mask information may be a matrix with a size of "N×D³". A process of combining the above estimation results may correspond to matrix multiplication, and a processing result (e.g., an instance segmentation result 503 of FIG. 5 and an instance segmentation result 603 of FIG. 6) may be instance segmentation information. The description provided with reference to FIGS. 3 and 4 may also apply to examples of FIGS. 5 and 6.

A process of determining a first offset will be described in detail with reference to operation C1 described above. The first offset may be obtained by processing fused image features through an MLP 721 to calculate a 3D keypoint offset as shown in FIG. 7.

In an example, operation C3 may include determining an initial predicted value of a key point predicted based on a point cloud, based on the first offset and the point cloud information, determining a target predicted value of a keypoint in the 3D grid based on the initial predicted value and the instance segmentation information, and determining key point information of an object through a regression scheme based on the target predicted value.

The keypoint information of the object determined through the regression may be obtained by processing the first offset and the instance segmentation information using an MLP 724 for location-aware 3D keypoint regression as shown in FIG. 7.

The description of operation C1 may apply to an operation of determining the initial predicted value and the target predicted value. In operation C1, a target predicted value may be determined based on an initial predicted value and instance mask information. In operation C3, a target predicted value may be determined based on an initial predicted value and instance segmentation information. Since some redundant information is effectively excluded from the instance segmentation information, the target predicted value determined in operation C3 may have a high accuracy.

In an example, an operation of determining the keypoint information of the object through the regression based on the target predicted value in operations C1 and C2 may include any one or any combination of any two or more of operations C01 through C04 that will be described below.

C01: for each keypoint of an object, determining an average value of a target predicted value corresponding to a keypoint and each point cloud, as keypoint information.

For each location that may correspond to each cell, a target predicted value may indicate coordinate information (e.g., a predicted coordinate value) of each keypoint predicted based on each point cloud. An example of three point clouds and two keypoints is shown in Table 1 below.

TABLE 1

|  | Keypoint 1 | Keypoint 2 |
| --- | --- | --- |
| Point cloud 1 | (a1, b1, c1) | (d1, e1, f1) |
| Point cloud 2 | (a2, b2, c2) | (d2, e2, f2) |
| Point cloud 3 | (a3, b3, c3) | (d3, e3, f3) |

In Table 1, each point cloud may have a corresponding predicted coordinate value (e.g., a target predicted value) for each keypoint.

In an example, operation C01 may be expressed as shown in Equation 1 below.

$$y = \Sigma x_i / N \qquad \text{Equation 1:}$$

In Equation 1, i=1, . . . , N. i denotes a point cloud identifier, N denotes the total number of point clouds, x denotes a target predicted value, and y denotes keypoint information (e.g., a spatial coordinate value of a keypoint).

For example, spatial coordinate information of a keypoint 1 may be a coordinate value obtained by calculating [(a1, b1, c1)+(a2, b2, c2)+(a3, b3, c3)]/3.

C02: for each keypoint of an object, determining a weighted average value of a probability value corresponding to each point cloud in the instance mask information and a target predicted value corresponding to a keypoint and each point cloud, as keypoint information.

Operation C02 may correspond to weighted regression using an instance mask segmentation reliability M based on location awareness as a weight. When a reliability contribution to mask prediction is small, a contribution to keypoint prediction may be small.

In an example, operation C02 may be expressed as shown in Equation 2 below.

$$y = \Sigma w_i x_i / \Sigma w_i \qquad \text{Equation 2:}$$

In Equation 2, i=1, . . . , N. i denotes a point cloud identifier, N denotes the total number of point clouds, x denotes a target predicted value, and w denotes a mask reliability (e.g., a probability value of each cell corresponding to each point cloud) of each cell. For example, w=W_ins$_{idx}$, and idx=1, . . . , D³. W_ins may be an output probability map of a network of instance mask segmentation, and idx may be a spatial location label of a cell in which an object is located. For example, w=M_idx.

An example of Table 1 may be applied to a target predicted value. The probability value corresponding to each point cloud in the instance mask information may correspond to a probability value corresponding to a current location (e.g., a current cell) of each point cloud in which a plurality of cells may be present in a 3D grid. During the instance mask segmentation, a probability value of each cell corresponding to each point cloud may be predicted.

For example, spatial coordinate information of keypoint 1 may be a coordinate value obtained by calculating [w1×(a1, b1, c1)+w2×(a2, b2, c2)+w3×(a3, b3, c3)]/3.

C03: for each keypoint of an object, determining a weighted average value of a target predicted value corresponding to a keypoint and a point cloud of a preset value closest to a central point of the object and a probability value corresponding to the point cloud of the preset value in the instance mask information, as keypoint information of the object.

In an example, operation C03 may be expressed as shown in Equation 3 below.

$$y = \Sigma w_i x_i / \Sigma w_i \qquad \text{Equation 3:}$$

In Equation 3, i=1, . . . , T. i denotes a point cloud identifier, and T denotes the total number of point clouds.

"T" point clouds may be obtained by arranging offset prediction values of all point clouds for a center (a keypoint) of an object in an ascending order and selecting top "T" point clouds from all the point clouds. An offset prediction value of a point cloud may be represented as $\sqrt{dx^2+dy^2+dz^2}$ and dx, dy, and dz may correspond to an offset prediction value (or a target predicted value) for three directions, that is, x, y, and z directions, respectively. keypoint information of operation C03 may be calculated through the "T" point clouds. For example, x may denote a target predicted value, and w may denote a mask reliability (e.g., a probability value of each cell corresponding to each point cloud) of each cell. For example, w=W_ins$_{idx}$, and idx=1, . . . , $D^3$. W_ins may be an output probability map of a network of instance mask segmentation, and idx may be a spatial location label of a cell in which an object is located. For example, w=M_idx.

An example of Table 1 may be applied to a target predicted value. When first "T" point clouds (e.g., T=2) among current three point clouds are assumed to be a point cloud 1 and a point cloud 3, spatial coordinate information of a keypoint 1 may be a coordinate value obtained by calculating [w1×(a1, b1, c1)+w3×(a3, b3, c3)]/[w1+w3].

C04: for each keypoint of an object, determining a weighted average value of a distance approximate value corresponding to a keypoint and each point cloud, a target predicted value corresponding to a keypoint and each point cloud, and a probability value corresponding to each point cloud in the instance mask information, as keypoint information.

A distance approximate value between a keypoint and a point cloud may correspond to a result obtained by quantizing a distance between each point cloud and a keypoint of an object in a predetermined range (e.g., [0, 1]). The above distance approximate value may be expressed as shown in Equation 4 below.

$$p=(d\_max-offset)/d\_max \qquad \text{Equation 4:}$$

In Equation 4, d_max denotes a greatest Euclidean distance between a keypoint and all point clouds of an object. For example, d_max may be calculated using a target predicted value and point cloud spatial coordinate values, or may be a preset threshold constant. Also, offset may be predicted through an offset estimation task. For example, offset=$\sqrt{dx^2+dy^2+dz^2}$, and dx, dy, and dz may correspond to predicted offset values for three directions, that is, x, y, and z directions, respectively. Based on the distance approximate value as in Equation 4, it may be determined that a distance between a point cloud and a keypoint decreases as a distance approximate value p increases.

In an example, operation C04 may be expressed as shown in Equation 5 below.

$$y=\Sigma w_i p_i x_i / \Sigma w_i p_i \qquad \text{Equation 5:}$$

In Equation 5, i=1, . . . , N. i denotes a point cloud identifier, N denotes the total number of point clouds, x denotes a target predicted value, p denotes a distance approximate value, and w denotes a mask reliability (e.g., a probability value of each cell corresponding to each point cloud) of each cell. For example, w=W_ins$_{idx}$, and idx=$D^3$. W_ins may be an output probability map of a network of instance mask segmentation, and idx may be a spatial location label of a cell in which an object is located. For example, w=M_idx.

An example of Table 1 may be applied to a target predicted value.

Spatial coordinate information of a keypoint 1 may be a coordinate value obtained by calculating [w1×p1×(a1, b1, c1)+w2×p2×(a2, b2, c2)+w3×p3×(a3, b3, c3)]/[w1×p1+w2×p2+w3×p3].

When operation C04 is implemented, an influence caused by an abnormal value of an offset predicted through an offset estimation task may be additionally removed, in comparison to operation C01. In an example, a model of which an output value is a predicted value and that outputs a distance approximate value p may be added before a regression model of a network, to reduce an amount of calculation during regression calculation.

In an example, a regression model of a network structure may perform a keypoint regression task. The keypoint regression task may include operations C01 through C04. During training of the network, a regression model may be added as a portion of the network for training. In another example, the regression model may also be located outside the network. In this example, only network parameters of each task such as feature extraction, semantic segmentation, instance mask segmentation, and keypoint offset estimation may be trained and updated during the training of the network.

Figure 10:
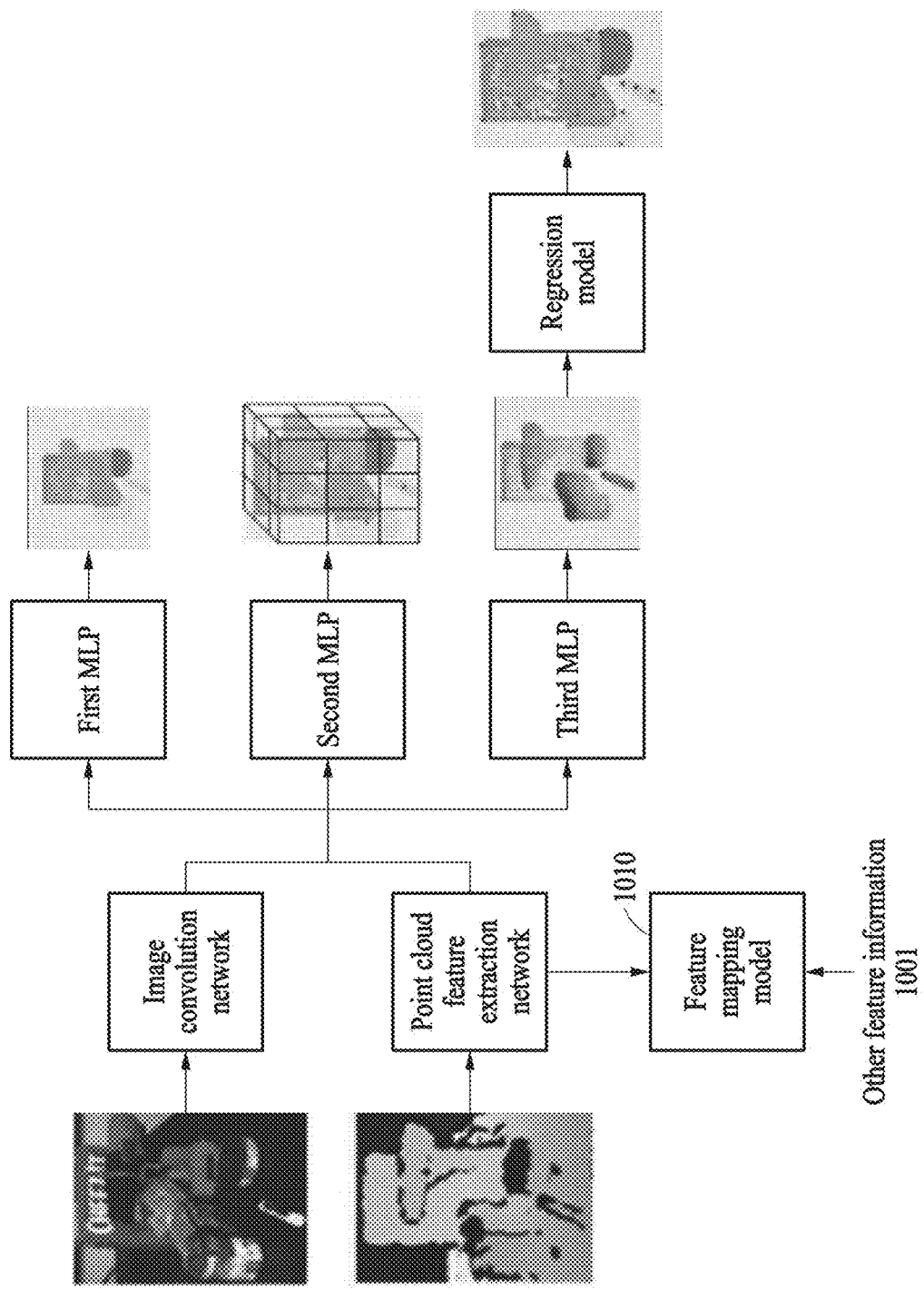
FIG. 10 illustrates an example of a network structure for object pose estimation.
Figure 11:
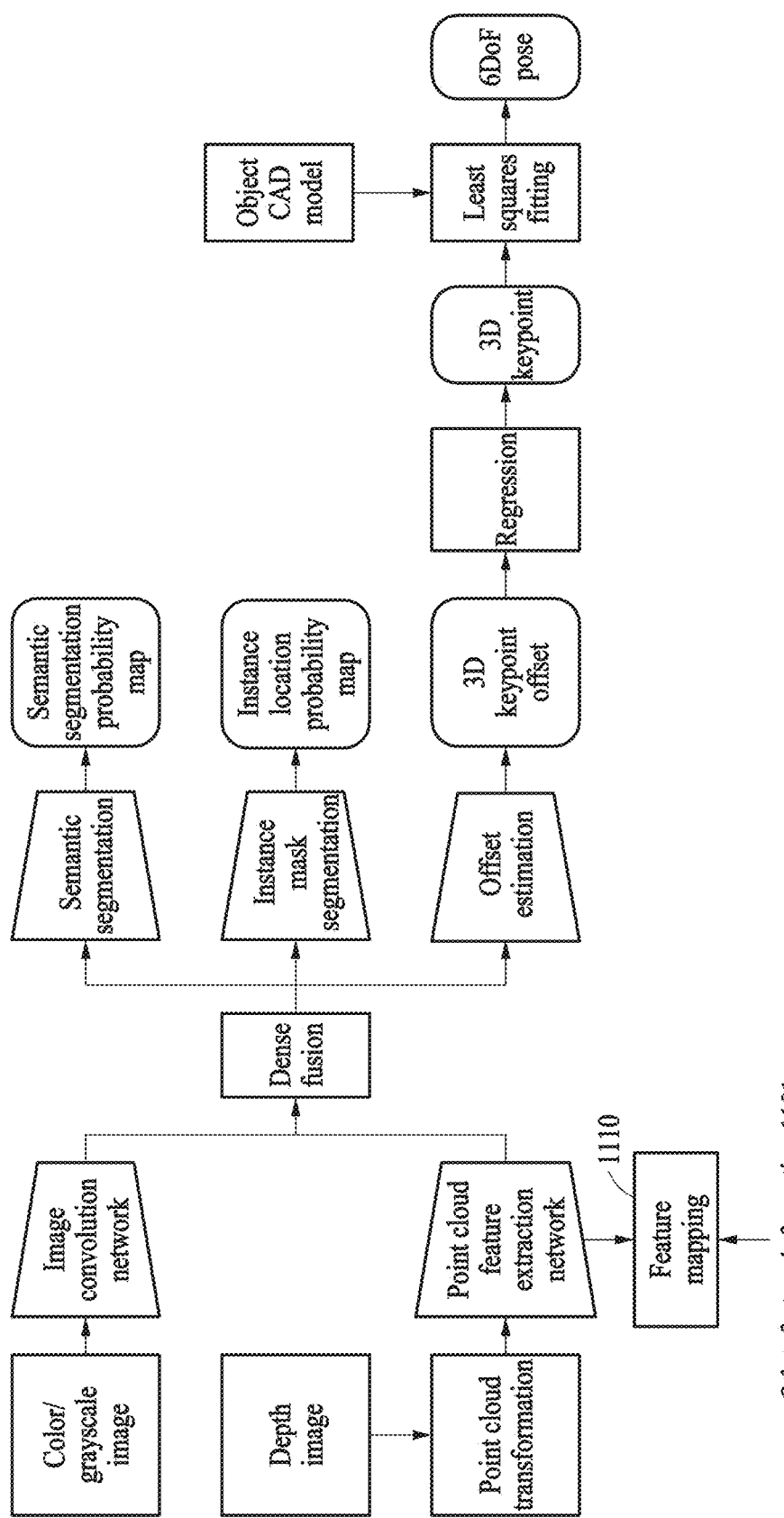
FIG. 11 illustrates an example of object pose estimation.

When a point cloud feature is extracted based on a depth image, representation of a point cloud feature including spatial coordinate information may be limited. Accordingly, other features such as RGB colors, a normal vector, and the like may be added. However, a large amount of time may be used to calculate other feature information. According to examples, a feature mapping model 1010 of FIG. 10 may be provided. The feature mapping model 1010 may add other feature information 1001 and 1101, to enhance a pose estimation accuracy of a network and guarantee timeliness. The other feature information 1001 and 1101 may correspond to a point cloud including other features such as RGB color, a normal vector, and the like, and a feature mapping task 1110 may be performed through the feature mapping model 1010. As shown in FIG. 10 or 11, a point cloud feature may be extracted based on an input depth image in operations A1 and A2. Accordingly, the feature mapping model 1010 may be added to the examples of FIGS. 3 and 4. A color image of FIG. 11 may be replaced with a grayscale image. The description provided with reference to FIGS. 3 and 4 may also apply to examples of FIGS. 10 and 11. Here, the following operations A11 and A12 may be further performed.

A11: obtaining point cloud information corresponding to the input depth image.

A12: extracting a point cloud feature based on any one or any combination of point cloud information, a color feature, and a normal feature.

In a network training process, when a point cloud feature is extracted, feature extraction training may be performed by inputting corresponding point cloud information obtained based on the input depth image to a point cloud feature extraction network. In addition, when the point cloud information and a larger amount of other feature information (e.g., RGB color, a normal vector, etc.) are input to the point cloud feature extraction network, and when a Euclidean distance is minimized through processed feature information (here, other distance measurement schemes may be used), an image feature corresponding to a point cloud may have a large number of other feature representations and an amount of time used to extract other feature information may be reduced during testing and using of the network.

In FIGS. 4, 6, and 11 described above, a square box may represent an operation of a task or a network structure, and a rounded box may represent a processing result. As shown in FIG. 4, a box corresponding to dense fusion may represent fusion of an image pixel feature and a point cloud feature, and the semantic segmentation probability map 403 may represent output data of the first MLP 321.

Figure 12:
FIG. 12 illustrates an example of an application scene.
Figure 13:
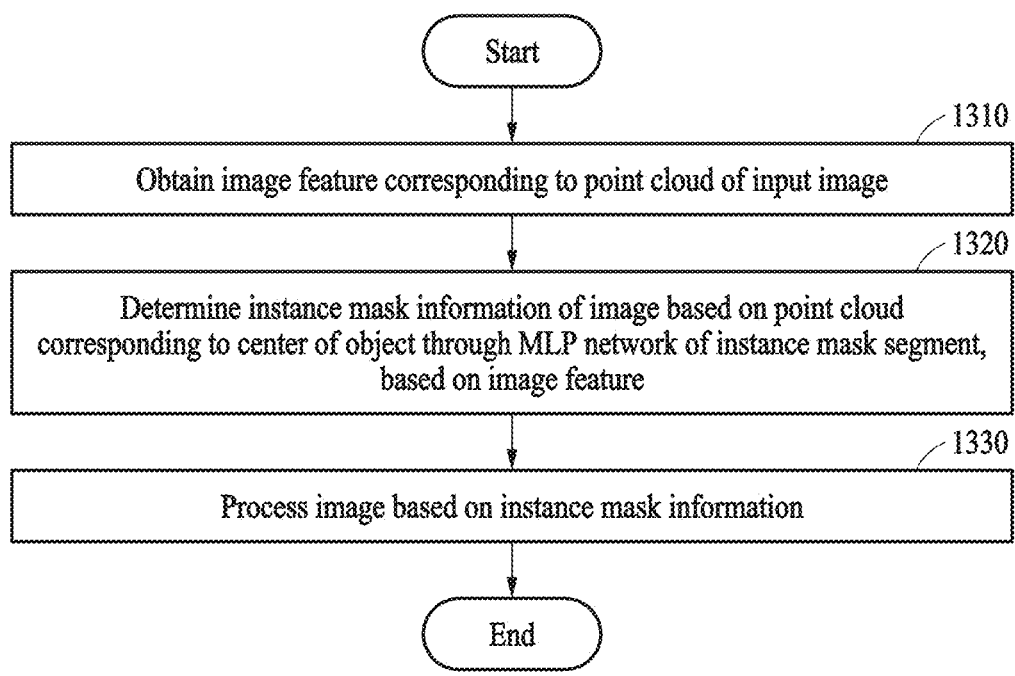
FIG. 13 is a flowchart illustrating an example of a method of processing an image.

FIG. 12 illustrates an example of a scene in which a method of estimating a pose of an object is applied to an AR system. An image 1201 of an object may be captured in real time by AR glasses worn by a user. Captured content may be video data corresponding to a 3D space in front of the user when the user uses a corresponding AR system. When a pose of the object is estimated, each image frame of video data may be processed. Referring to FIG. 12, a virtual object may be displayed to overlap a real object. According to examples, virtual content may be aligned on the real object with an accurate pose in real time. In an example of a moving object in a real scene, a virtual object with little delay artifact in the real scene may be updated in time in the AR system, through real-time pose estimation. The user may perceive the virtual object displayed to be aligned with the real object in real time.

To further describe an effect of implementing the method of estimating a pose of an object in a network provided in the examples, experimental data shown in Table 2 below may be provided.

The image may include one or more objects, and each object may correspond to one or more point clouds. In the examples, the instance mask segmentation operation may be performed through an MLP network, and the description of operations B1 and B2 may apply to a process of processing the image feature in a corresponding network.

Hereinafter, an example of a process of training the MLP network to complete an instance mask segmentation task will be described in detail. An operation of training the MLP network of instance mask segmentation may include the following operations S21 through S23:

S21: obtaining a training data set (the training data set may include a plurality of training images and object display information corresponding to each of the training images).

S22: inputting a training image to the MLP network of instance mask segmentation, so that a corresponding network outputs prediction network information corresponding to each point cloud of an object based on a cell in which a point cloud corresponding to a center of the object is located based on a 3D network corresponding to the input training image.

S23: determining a parameter of the MLP network of instance mask segmentation, based on the prediction network information and the object display information

TABLE 2

| GPU type | PVN3D according to the related art (Time corresponding to each model and all models) | | | | Present application (Time corresponding to each model and all models) | | | Acceleration ratio |
|---|---|---|---|---|---|---|---|---|
| | Neural network | Clustering | Fitting | Total time | Neural network | Fitting | Total time | |
| K80x1 | 37 ms | 1968 ms | 2 ms | 2007 ms | 40 ms | 2 ms | 42 ms | 47 times faster |
| P40x1 | 24 ms | 1565 ms | 2 ms | 1591 ms | 25 ms | 2 ms | 27 ms | 58 times faster |
| V100x1 | 24 ms | 343 ms | 2 ms | 369 ms | 25 ms | 2 ms | 27 ms | 13 times faster |

As shown in the experimental data shown in Table 2, in the examples of the present application, PVN3D (e.g., a 3D keypoint detection neural network based on Hough voting) and an inference time (object instance segmentation and object keypoint detection may be performed by post-processing clustering) of each model thereof may be calculated using a YCB video data set (e.g., a pose estimation data set). Here, in the examples, a single branch scheme based on division at equal intervals may be used for a location-aware network. For example, D may be set to "10". The fitting (e.g., least-squares fitting) may correspond to least-squares fitting used to calculate a 6DoF pose of an object. Experimental tests show that acceleration of object pose estimation in different types of GPUs is implemented in the examples, compared to PVN3D.

In an example, an image processing method including operations 1310 through 1330 may be further performed.

1310: obtaining an image feature corresponding to a point cloud of an input image.

The description of operation 110 may apply to the image feature corresponding to the point cloud of the input image obtained in operation 1310. An image may be, for example, a depth image, a color image, and a grayscale image.

1320: determining instance mask information of an image based on a point cloud corresponding to a center of an object through an MLP network of instance mask segmentation, based on the image feature.

A network training method may include the following two schemes.

(1) The object display information may indicate a real location (e.g., a grid) corresponding to each point cloud of an object in a 3D space. The training image may include a plurality of objects, and each of the objects may correspond to an individual label. The MLP network of instance mask segmentation may output initial grid information corresponding to each point cloud of an object, and initial grid information of a point cloud corresponding to a center of the object may be determined to be prediction grid information corresponding to each point cloud of the object based on the initial grid information combined with grid information in which the point cloud corresponding to the center of the object center is located. When a network parameter is determined, the network parameter may be updated based on the initial grid information and display information. For example, a loss value of each iteration of the network may be determined based on a preset loss function, for example, a dice loss, a softmax loss, and the like, and the network parameter may be updated based on the loss value.

(2) Object label information may indicate a real location (e.g., a grid) corresponding to a point cloud corresponding to a center of an object in the 3D space. The MLP network of instance mask segmentation may output grid information (e.g., prediction grid information) in which a point cloud corresponding to a center of an object is located. Network parameters may be updated based on the prediction grid information and label information.

In other words, during training of the network, grid information corresponding to the point cloud corresponding to the center of the object may be trained, and grid information corresponding to another point cloud of the object may be regarded to be matched to the grid information corresponding to the point cloud corresponding to the center of the object.

1330: Processing the image based on the instance mask information.

In an example, the image processing method may further include operation S4.

S4: determining semantic segmentation information of the image based on the image feature.

The description of operation 120 may apply to operation S4.

Operation 1330 may include operations S31 and S32 that will be described below.

S31: determining instance segmentation information of an object based on the semantic segmentation information and the instance mask information.

The description of operation C3 may apply to the specific process of operation S31.

S32: Process image based on instance segmentation information.

In an example, the image processing method may be applied to the object pose estimation method to estimate the pose of the object.

Figure 14:
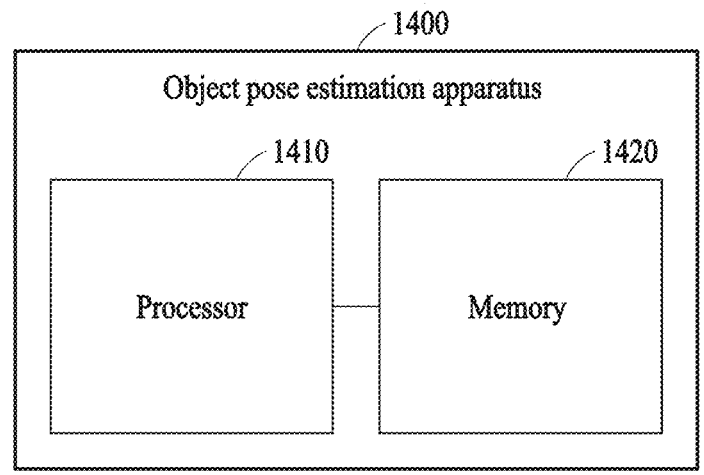
FIG. 14 illustrates an example of an object pose estimation apparatus.

FIG. 14 illustrates an example of an object pose estimation apparatus. Referring to FIG. 14, an object pose estimation apparatus 1400 may include a processor 1410 (e.g., one or more processors) and a memory 1420 (e.g., one or more memories). The memory 1420 may be connected to the processor 1410 and may store instructions executable by the processor 1410, data to be computed by the processor 1410, or data processed by the processor 1410. The memory 1420 may include a non-transitory computer-readable medium, for example, a high-speed random-access memory (RAM), and/or a non-volatile computer-readable storage medium, for example, any one or any combination of any two or more of a disk storage device, a flash memory device, and other non-volatile solid-state memory devices.

The processor 1410 may execute the instructions to perform one or more or all of the operations described above with reference to FIGS. 1 through 13 and 15. For example, the processor 1410 may obtain an image feature corresponding to a point cloud of an input image, may determine semantic segmentation information, instance mask information, and keypoint information of an object based on the image feature, and may estimate a pose of the object based on the semantic segmentation information, the instance mask information, and the keypoint information. In addition, the description provided with reference to FIGS. 1 through 13 and 15 may apply to the object pose estimation apparatus 1400.

Figure 15:
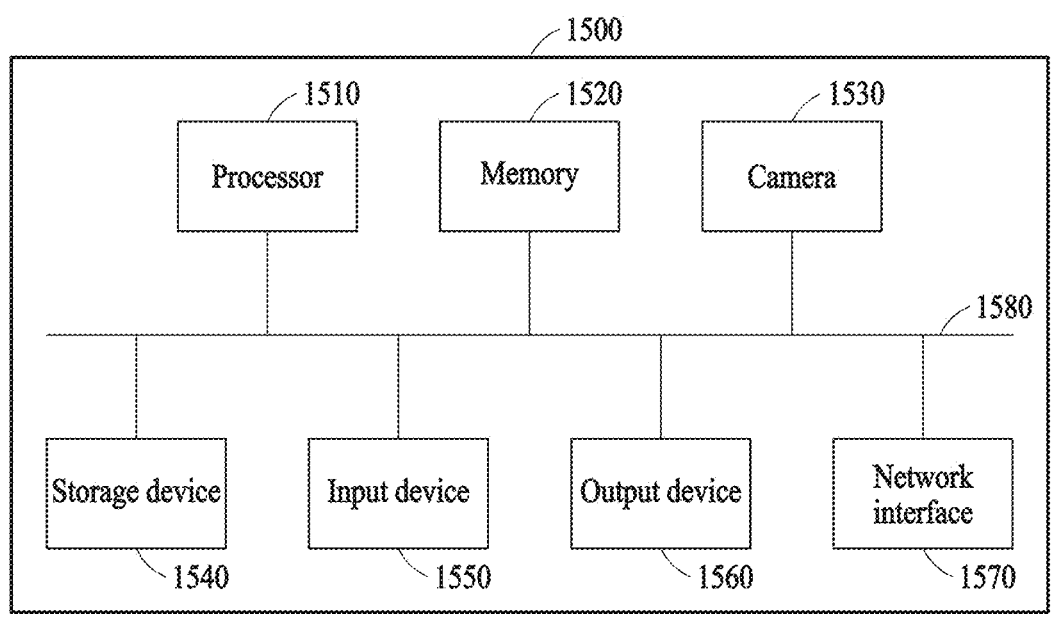
FIG. 15 illustrates an example of an electronic device.

FIG. 15 illustrates an example of an electronic device. Referring to FIG. 15, an electronic device 1500 may include a processor 1510 (e.g., one or more processors), a memory 1520 (e.g., one or more memories), a camera 1530, a storage device 1540, an input device 1550, an output device 1560, and a network interface 1570, and these components may communicate with one another through a communication bus 1580. For example, the electronic device 1500 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic device 1500 may include, structurally and/or functionally, the object pose estimation apparatus 1400 of FIG. 14.

The processor 1510 may execute instructions and functions in the electronic device 1500. For example, the processor 1510 may process the instructions stored in the memory 1520 or the storage device 1540. The processor 1510 may perform one or more or all of the operations or methods described above with reference to FIGS. 1 through 14. The memory 1520 may include a non-transitory computer-readable storage medium or a non-transitory computer-readable storage device. The memory 1520 may store instructions that are to be executed by the processor 1510, and may also store information associated with software and/or applications when the software and/or applications are being executed by the electronic device 1500.

The camera 1530 may capture a photo and/or a video. The storage device 1540 may include a non-transitory computer-readable storage medium or a non-transitory computer-readable storage device. The storage device 1540 may store a greater amount of information than the memory 1520 and store the information for a long period of time. For example, the storage device 1540 may include a magnetic hard disk, an optical disk, a flash memory, a floppy disk, or other non-volatile memories known in the art.

The input device 1550 may receive an input from a user through a traditional input scheme using a keyboard and a mouse, and through a new input scheme such as a touch input, a voice input and an image input. The input device 1550 may include, for example, a keyboard, a mouse, a touchscreen, a microphone, and other devices that may detect an input from a user and transmit the detected input to the electronic device 1500. The output device 1560 may provide an output of the electronic device 1500 to a user through a visual, auditory, or tactile channel. The output device 1560 may include, for example, a display, a touch screen, a speaker, a vibration generator, or any other device that provides an output to a user. The network interface 1570 may communicate with an external device through a wired or wireless network.

Object pose estimation according to examples may be performed using an AI model.

In an example, in the object pose estimation, an image or output data for identifying image features in the image may be obtained using image data or video data as input data of the AI model. The AI model may be obtained through training. Here, "being obtained through training" may refer to obtaining a predefined operation rule or AI model that is configured to perform a desired feature (or objective) by training a basic AI model with a plurality of sets of training data through a training algorithm. The AI model may include a plurality of neural network layers. Each of the plurality of neural network layers may include a plurality of weight values, and a neural network computation may be performed by a calculation between a calculation result from a previous layer and the plurality of weight values.

Visual understanding may be technology of recognizing and processing an object similarly to human visual perception, and may include, for example, object recognition, object tracking, image search, human recognition, scene recognition, 3D reconstruction/positioning, or image augmentation.

The object pose estimation may be implemented by one or more modules among a plurality of modules based on the AI model. AI-related functions may be performed by a non-volatile memory, a volatile memory, and a processor.

The processor 1510 may include one or more processors. The one or more processors may be, for example, general-purpose processors such as a central processing unit (CPU) and an application processor (AP), dedicated graphics processors such as a graphics processing unit (GPU) and a vision processing unit (VPU), and/or dedicated AI processors such as a numeric processing unit (NPU).

The one or more processors may control processing of input data based on a predefined operation rule or AI model stored in the non-volatile memory and the volatile memory. The predefined operation rule or AI model may be provided through training or learning.

Herein, providing of the predefined operation rules or AI model through learning may indicate obtaining a predefined operation rule or AI model with desired characteristics by applying a learning algorithm to a plurality of pieces of training data. The training may be performed by a device having an AI function according to the disclosure, or by a separate server and/or system.

The AI model may include a plurality of neural network layers. Each of the neural network layers may have a plurality of weight values, and calculation of one layer may be performed through a calculation result of a previous layer and a plurality of weight values of a current layer. A neural network may include, for example, a CNN, a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network, but is not limited thereto.

The learning algorithm may be a method of training a predetermined target device, for example, a robot, based on a plurality of pieces of training data and of enabling, allowing or controlling the target device to perform determination or prediction. The learning algorithm may include, for example, supervised learning, unsupervised learning, semi-supervised learning, or reinforcement learning, but is not limited thereto.

The object pose estimation apparatuses, processors, memories, electronic devices, cameras, storage devices, input devices, output devices, network interfaces, communication buses, object pose estimation apparatus 1400, processor 1410, memory 1420, electronic device 1500, processor 1510, memory 1520, camera 1530, storage device 1540, input device 1550, output device 1560, network interface 1570, communication bus 1580, and other apparatuses, devices, units, modules, and components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with object pose estimation, the method comprising:
   determining an image feature corresponding to a point cloud of an input image;
   determining semantic segmentation information, instance mask information, and keypoint information of an object, based on the image feature; and
   estimating a pose of the object based on the semantic segmentation information, the instance mask information, and the keypoint information.

2. The method of claim 1, wherein the input image comprises a depth image, and wherein the determining of the image feature comprises: extracting a point cloud feature based on the depth image; and determining the point cloud feature to be the image feature.

3. The method of claim 2, wherein the extracting of the point cloud feature comprises:
   determining point cloud information corresponding to the depth image; and
   extracting the point cloud feature based on any one or any combination of any two or more of the point cloud information, a color feature, and a normal feature.

4. The method of claim 2,
   wherein the input image further includes either one or both of a color image and a grayscale image, and
   wherein the determining of the image feature comprises:
      extracting a first image feature based on either one or both of the color image and the grayscale image; and
      determining the image feature by fusing the point cloud feature and the first image feature.

5. The method of claim 4, wherein the determining of the image feature by fusing the point cloud feature and the first image feature comprises determining the image feature by pixel-wise fusing the point cloud feature and the first image feature.

6. The method of claim 1, wherein the determining of the semantic segmentation information, the instance mask information, and the keypoint information based on the image feature comprises:
   determining the semantic segmentation information corresponding to the point cloud based on the image feature;
   generating a three-dimensional (3D) grid based on point cloud information corresponding to the input image and determining the instance mask information based on the 3D grid; and
   determining the keypoint information using the instance mask information or using the semantic segmentation information and the instance mask information.

7. The method of claim 6,
   wherein the instance mask information indicates grid information corresponding to the point cloud in the 3D grid, and
   wherein network information corresponding to each point cloud of the object is determined based on grid information corresponding to a point cloud of a center of the object.

8. The method of claim 6, wherein the generating of the 3D grid based on the point cloud information comprises any one or any combination of any two or more of:
   determining a 3D grid by dividing a 3D space corresponding to the point cloud information at equal intervals;
   determining multiple 3D grids by dividing the 3D space corresponding to the point cloud information into different intervals; and
   determining multiple 3D grids by dividing the 3D space corresponding to the point cloud information based on same division starting points of different intervals.

9. The method of claim 6, wherein the determining of the keypoint information using the instance mask information comprises either one or both of:
   estimating a first offset of a keypoint corresponding to each point cloud based on the image feature and determining the keypoint information through regression based on the first offset and the instance mask information; and estimating a second offset of a keypoint corresponding to each point cloud in each cell of the 3D grid based on the image feature and the instance mask information, and determining the keypoint information through regression based on the second offset.

10. The method of claim 6, wherein the determining of the keypoint information using the instance mask information comprises:

estimating a second offset of a keypoint corresponding to each point cloud in each cell of the 3D grid based on the image feature and the instance mask information; and determining the keypoint information through regression based on the second offset by determining a target predicted value of a key point predicted based on a point cloud, based on the second offset and the point cloud information, and determining the keypoint information through regression based on the target predicted value.

11. The method of claim 10, wherein the determining of the target predicted value and the determining of the keypoint information through the regression based on the target predicted value comprises any one or any combination of any two or more of:

for each keypoint of the object, determining an average value of a target predicted value corresponding to a keypoint and each point cloud, as keypoint information;

for each keypoint of the object, determining a weighted average value of a probability value corresponding to each point cloud in the instance mask information and a target predicted value corresponding to a keypoint and each point cloud, as keypoint information;

for each keypoint of the object, determining a weighted average value of a target predicted value corresponding to a keypoint and a point cloud of a preset value closest to a central point of the object and a probability value corresponding to the point cloud of the preset value in the instance mask information, as keypoint information of the object; and for each keypoint of the object, determining a weighted average value of a distance approximate value corresponding to a keypoint and each point cloud, a target predicted value corresponding to a keypoint and each point cloud, and a probability value corresponding to each point cloud in the instance mask information, as keypoint information.

12. The method of claim 6, wherein the determining of the keypoint information using the semantic segmentation information and the instance mask information comprises:

determining instance segmentation information based on the semantic segmentation information and the instance mask information;

estimating a first offset of a keypoint corresponding to each point cloud based on the image feature; and determining the keypoint information through regression based on the first offset and the instance segmentation information.

13. The method of claim 12, wherein the determining of the keypoint information through the regression based on the first offset and the instance segmentation information comprises:

determining an initial predicted value of a keypoint predicted based on a point cloud, based on the first offset and the point cloud information;

determining a target predicted value of a keypoint in the 3D grid based on the initial predicted value and the instance mask information; and determining the keypoint information through regression based on the target predicted value.

14. The method of claim 12, wherein the determining of the keypoint information through the regression based on the first offset and the instance segmentation information comprises:

determining an initial predicted value of a keypoint predicted based on a point cloud, based on the first offset and the point cloud information;

determining a target predicted value of a keypoint in the 3D grid based on the initial predicted value and the instance segmentation information; and determining keypoint information of an object through a regression scheme based on the target predicted value.

15. A non-transitory computer-readable storage medium storing instructions that, when executed by a processor, configure the processor to perform the method of claim 1.

16. The method of claim 1, wherein the estimating of the pose of the object includes estimating an orientation of the object.

17. The method of claim 16, wherein the estimated pose is a 6 Degree-of-Freedom (DoF) pose.

18. The method of claim 1, wherein the keypoint information is a determined location of the object.

19. The method of claim 1, wherein the determining of the keypoint information includes determining the keypoint information based on determined instance segmentation information of the object.

20. The method of claim 19, further comprising determining the instance segmentation information based on the semantic segmentation information and the instance mask information.

21. The method of claim 1, wherein the instance mask information indicates in which regions in a multi-dimensional space include point cloud information of the object is present and/or in which regions in the multi-dimensional space the point cloud information of the object is not present.

22. An apparatus with object pose estimation, the apparatus comprising:

a processor configured to:
determine an image feature corresponding to a point cloud of an input image;
determine semantic segmentation information, instance mask information, and keypoint information of an object, based on the image feature; and
estimate a pose of the object based on the semantic segmentation information, the instance mask information, and the keypoint information.

23. The apparatus of claim 22,
wherein, for the determining of the semantic segmentation information, the instance mask information, and the keypoint information, the processor is configured to:
determine the semantic segmentation information corresponding to the point cloud based on the image feature;
generate a three-dimensional (3D) grid based on point cloud information corresponding to the input image and determine the instance mask information based on the 3D grid; and
determine the keypoint information using the instance mask information or using the semantic segmentation information and the instance mask information, wherein the instance mask information indicates grid information corresponding to the point cloud in the 3D grid, and wherein network information corresponding to each point cloud of the object is determined based on grid information corresponding to a point cloud of a center of the object.

24. The apparatus of claim 23, wherein, for the determining of the keypoint information using the instance mask information, the processor is configured to:

estimate a first offset of a keypoint corresponding to each point cloud based on the image feature;

estimate a second offset of a keypoint corresponding to each point cloud in each cell of the 3D grid based on the image feature and the instance mask information; and determine the keypoint information through either one or both of regression based on the first offset and the instance mask information and regression based on the second offset.

25. The apparatus of claim 22, further comprising a memory storing instructions that, when executed by the processor, configure the processor to perform the determining of the image feature, the determining of the semantic segmentation information, the instance mask information, and the keypoint information, and the estimating of the pose.

26. An electronic device comprising:

a camera configured to generate an input image; and a processor configured to:

determine an image feature corresponding to a point cloud of the input image;

determine semantic segmentation information, instance mask information, and keypoint information of an object, based on the image feature; and estimate a pose of the object based on the semantic segmentation information, the instance mask information, and the keypoint information.

27. The device of claim 26, wherein, for the determining of the semantic segmentation information, the instance mask information, and the keypoint information, the processor is configured to:

determine the semantic segmentation information corresponding to the point cloud based on the image feature;

generate a three-dimensional (3D) grid based on point cloud information corresponding to the input image and determine the instance mask information based on the 3D grid; and determine the keypoint information using the instance mask information or using the semantic segmentation information and the instance mask information, wherein the instance mask information indicates grid information corresponding to the point cloud in the 3D grid, and wherein network information corresponding to each point cloud of the object is determined based on grid information corresponding to a point cloud of a center of the object.

28. A processor-implemented method with object pose estimation, the method comprising:

determining an image feature based on three-dimensional (3D) space information corresponding to an input image;

determining semantic segmentation information based on the image feature;

determining instance mask information based on the 3D space information;

determining keypoint information based on the instance mask information; and determining a pose of an object based on the semantic segmentation information, the instance mask information, and the keypoint information.

29. The method of claim 28, wherein the 3D space information comprises point cloud information.

30. The method of claim 29, wherein the determining of the keypoint information comprises:

estimating, for each point cloud of the point cloud information, an offset of a keypoint based on the image feature; and determining the keypoint information through regression based on the offsets.

* * * * *